(12) United States Patent
LoBue et al.

(10) Patent No.: US 11,817,815 B2
(45) Date of Patent: Nov. 14, 2023

(54) SYSTEMS FOR DAMPING A SOLAR PHOTOVOLTAIC ARRAY TRACKER

(71) Applicant: FTC Solar, Inc., Austin, TX (US)

(72) Inventors: Joseph D. LoBue, Dale, TX (US); Nagendra Srinivas Cherukupalli, Cupertino, CA (US); Tamilarasan Mouniandy, Chennai (IN); Milo Zabala, Concord, CA (US)

(73) Assignee: FTC Solar, Inc., Austin, TX (US)

( * ) Notice: Subject to any disclaimer, the term of this patent is extended or adjusted under 35 U.S.C. 154(b) by 0 days.

(21) Appl. No.: 17/806,669

(22) Filed: Jun. 13, 2022

(65) Prior Publication Data

US 2022/0311376 A1 Sep. 29, 2022

Related U.S. Application Data

(63) Continuation of application No. 17/302,826, filed on May 13, 2021, now Pat. No. 11,394,343.
(Continued)

(51) Int. Cl.
*H02S 20/32* (2014.01)
*F16M 11/10* (2006.01)
(Continued)

(52) U.S. Cl.
CPC .............. *H02S 20/32* (2014.12); *F15B 15/20* (2013.01); *F16F 9/0254* (2013.01); *F16F 9/185* (2013.01);
(Continued)

(58) Field of Classification Search
CPC ...................... H02S 20/00–32; F16F 9/00–585
See application file for complete search history.

(56) References Cited

U.S. PATENT DOCUMENTS

| 2,186,266 A | 1/1940 | Onions |
| 3,106,992 A | 10/1963 | Sherburne |

(Continued)

FOREIGN PATENT DOCUMENTS

| CN | 212163236 U | 12/2020 |
| JP | 2014114838 A | 6/2014 |
| KR | 807776 B1 | 2/2021 |

OTHER PUBLICATIONS

Invitation to Pay Additional Fees issued in International Application No. PCT/US2022/011046 dated Mar. 1, 2022, pp. 1-2.
(Continued)

*Primary Examiner* — Bach T Dinh
(74) *Attorney, Agent, or Firm* — Armstrong Teasdale LLP

(57) ABSTRACT

Solar tracker systems include a torque tube, a column supporting the torque tube, a solar panel connected to the torque tube, and a damper assembly. The damper assembly includes a first end pivotably connected to the torque tube and a second end pivotably connected to the column. The damper assembly further includes an outer shell, a piston within and moveable relative to the outer shell, a first chamber wall and a second chamber wall within the outer shell at least partially defining a chamber, and a valve within the chamber. The valve includes a first axial end defining a slot and is biased to a first position within the chamber in which the first axial end is spaced from the first chamber wall. The valve is moveable within the chamber from the first position to a second position to passively change a flow resistance of the damper assembly.

20 Claims, 37 Drawing Sheets

Related U.S. Application Data

(60) Provisional application No. 63/199,643, filed on Jan. 14, 2021.

(51) Int. Cl.

| | | |
|---|---|---|
| *F16F 9/34* | (2006.01) | |
| *F16F 9/36* | (2006.01) | |
| *F16F 9/50* | (2006.01) | |
| *F16F 9/18* | (2006.01) | |
| *F24S 30/425* | (2018.01) | |
| *F16F 9/02* | (2006.01) | |
| *F24S 40/00* | (2018.01) | |
| *F15B 15/20* | (2006.01) | |
| *H02S 50/00* | (2014.01) | |
| *H02S 30/10* | (2014.01) | |
| *H02S 40/30* | (2014.01) | |
| *F24S 30/00* | (2018.01) | |
| *F16F 9/44* | (2006.01) | |
| *F16F 9/49* | (2006.01) | |
| *F16F 9/10* | (2006.01) | |
| *H02S 99/00* | (2014.01) | |

(52) U.S. Cl.
CPC ............ *F16F 9/34* (2013.01); *F16F 9/369* (2013.01); *F16F 9/50* (2013.01); *F16M 11/10* (2013.01); *F24S 30/425* (2018.05); *F24S 40/00* (2018.05); *H02S 30/10* (2014.12); *H02S 40/30* (2014.12); *H02S 50/00* (2013.01); *F16F 9/10* (2013.01); *F16F 9/103* (2013.01); *F16F 9/44* (2013.01); *F16F 9/49* (2013.01); *F16F 2222/12* (2013.01); *F16F 2228/066* (2013.01); *F16F 2230/0041* (2013.01); *F16F 2230/30* (2013.01); *F16F 2232/08* (2013.01); *F16F 2234/02* (2013.01); *F24S 2030/115* (2018.05); *F24S 2030/19* (2018.05); *H02S 99/00* (2013.01)

(56) References Cited

U.S. PATENT DOCUMENTS

| | | | |
|---|---|---|---|
| 3,762,514 A | 10/1973 | Freitab | |
| 4,088,286 A | 5/1978 | Masclet et al. | |
| 4,328,789 A | 5/1982 | Nelson | |
| 4,493,659 A | 1/1985 | Iwahita | |
| 4,632,091 A | 12/1986 | Wiens | |
| 5,111,917 A | 5/1992 | Rothamel et al. | |
| 5,158,161 A | 10/1992 | Yamaoka et al. | |
| 5,193,655 A | 3/1993 | Sasaki et al. | |
| 5,280,863 A | 1/1994 | Schmittle | |
| 5,310,315 A | 5/1994 | Lafortune et al. | |
| 5,653,315 A | 8/1997 | Ekquist et al. | |
| 6,070,681 A | 6/2000 | Catanzarite et al. | |
| 6,175,989 B1 | 1/2001 | Carpenter et al. | |
| 6,353,733 B1 | 3/2002 | Murray et al. | |
| 6,363,928 B1 | 4/2002 | Anderson, Jr. | |
| 6,422,360 B1 | 7/2002 | Oliver et al. | |
| 6,676,119 B2 | 1/2004 | Becker et al. | |
| 7,658,071 B1 | 2/2010 | Mcdermott | |
| 7,997,264 B2 | 8/2011 | Sankrithi | |
| 8,274,028 B2 | 9/2012 | Needham et al. | |
| 8,387,762 B2 | 3/2013 | Kondo et al. | |
| 8,490,761 B2 | 7/2013 | Kondo | |
| 8,502,129 B2 | 8/2013 | Miller et al. | |
| 8,590,678 B2 | 11/2013 | Bombrys et al. | |
| 8,616,351 B2 | 12/2013 | Roessle et al. | |
| 8,662,072 B2 | 3/2014 | Butler et al. | |
| 8,820,699 B2 | 9/2014 | Hertel et al. | |
| 8,829,330 B2 | 9/2014 | Meyer et al. | |
| 8,857,110 B2 | 10/2014 | Constantinou et al. | |
| 8,899,560 B2 | 12/2014 | Allen et al. | |
| 8,905,016 B2 | 12/2014 | Sakai et al. | |
| 9,067,470 B2 | 6/2015 | Shimasaki et al. | |
| 9,067,471 B2 | 6/2015 | Tuts et al. | |
| 9,068,616 B1 | 6/2015 | Serbu | |
| 9,151,355 B2 | 10/2015 | Chen | |
| 9,156,520 B2 | 10/2015 | Van Zyl et al. | |
| 9,206,616 B2 | 12/2015 | Sarlis et al. | |
| 9,349,899 B2 | 5/2016 | Schwartz et al. | |
| 9,454,001 B2 | 9/2016 | Lehmann et al. | |
| 9,593,736 B2 | 3/2017 | Jordan et al. | |
| 9,667,756 B2 | 6/2017 | Koo et al. | |
| 9,969,233 B2 | 5/2018 | Leglize | |
| 10,029,534 B2 | 7/2018 | Giovanardi et al. | |
| 10,171,024 B2 | 1/2019 | Polk | |
| 10,174,802 B2 | 1/2019 | Osika et al. | |
| 10,180,171 B2 | 1/2019 | Laird et al. | |
| 10,544,850 B2 | 1/2020 | Ruan | |
| 10,648,528 B2 | 5/2020 | Kull et al. | |
| 10,697,514 B2 | 6/2020 | Marking | |
| 10,848,097 B1 | 11/2020 | Needham et al. | |
| 2005/0133319 A1 | 6/2005 | Wilhelm | |
| 2006/0102440 A1 | 5/2006 | Nygen et al. | |
| 2007/0034466 A1 | 2/2007 | Paesmans et al. | |
| 2008/0168981 A1 | 7/2008 | Cummings et al. | |
| 2009/0145708 A1* | 6/2009 | Kim .................. | F16F 9/5126 188/322.15 |
| 2010/0095955 A1 | 4/2010 | Carrasco | |
| 2011/0290307 A1 | 5/2011 | Workman | |
| 2012/0174962 A1 | 7/2012 | Koningsteain et al. | |
| 2012/0279487 A1 | 11/2012 | Pineau et al. | |
| 2012/0305052 A1 | 12/2012 | Bruneau | |
| 2013/0090808 A1 | 4/2013 | Lemme et al. | |
| 2013/0280064 A1 | 10/2013 | Van Steinvoren | |
| 2014/0084528 A1 | 3/2014 | Kurakami | |
| 2014/0366929 A1 | 12/2014 | Blau | |
| 2015/0033740 A1 | 2/2015 | Anderson et al. | |
| 2015/0377518 A1 | 12/2015 | Maxey et al. | |
| 2016/0025174 A1 | 1/2016 | Lizarraga | |
| 2016/0068373 A1 | 3/2016 | Chin et al. | |
| 2016/0153517 A1 | 6/2016 | Lizarraga | |
| 2016/0329860 A1 | 11/2016 | Kalus et al. | |
| 2016/0365823 A1 | 12/2016 | French et al. | |
| 2017/0093329 A1 | 3/2017 | Jensen | |
| 2017/0362822 A1 | 12/2017 | Kams et al. | |
| 2018/0013380 A1 | 1/2018 | Childress et al. | |
| 2018/0062566 A1 | 3/2018 | Grushkowitz et al. | |
| 2018/0091088 A1 | 3/2018 | Barton et al. | |
| 2018/0154079 A1 | 6/2018 | Anderson et al. | |
| 2018/0163364 A1 | 6/2018 | Huissoon | |
| 2018/0212551 A1 | 7/2018 | Polk | |
| 2018/0254740 A1 | 9/2018 | Corio | |
| 2018/0302026 A1 | 10/2018 | Basel et al. | |
| 2018/0328440 A1 | 11/2018 | Ruan | |
| 2019/0020302 A1 | 1/2019 | Chen et al. | |
| 2019/0072150 A1 | 3/2019 | Kull et al. | |
| 2019/0168561 A1 | 6/2019 | Bucknell | |
| 2019/0253021 A1* | 8/2019 | Needham .............. | G01M 9/04 |
| 2019/0372512 A1 | 12/2019 | Betts et al. | |
| 2020/0036325 A1 | 1/2020 | Poivet | |
| 2020/0076356 A1 | 3/2020 | Cherukupalli et al. | |
| 2020/0076359 A1 | 3/2020 | Barn | |
| 2020/0304059 A1 | 9/2020 | Henderson et al. | |
| 2021/0013828 A1* | 1/2021 | Hudson .................. | H02S 20/32 |
| 2021/0044252 A1 | 2/2021 | Needham et al. | |
| 2021/0159848 A1 | 5/2021 | Needham et al. | |
| 2021/0194417 A1 | 6/2021 | Sharpe | |

OTHER PUBLICATIONS

International Search Report and Written Opinion issued by the International Searching Authority in Application No. PCT/US2022/011046 dated May 18, 2022, p. 24.

\* cited by examiner

SYSTEMS FOR DAMPING A SOLAR PHOTOVOLTAIC ARRAY TRACKER

CROSS-REFERENCE TO RELATED APPLICATION

This application is a continuation of U.S. patent application Ser. No. 17/302,826, filed May 13, 2021, which claims the benefit of U.S. Provisional Patent Application No. 63/199,643, filed Jan. 14, 2021, the contents of both of which are incorporated herein by reference in their entirety.

FIELD OF THE DISCLOSURE

The field relates generally to systems for solar tracking and damping a photovoltaic (PV) array. In some embodiments, the system includes a damper assembly that absorbs external loads, such as wind, on the photovoltaic array, and may be actively locked to prevent damage.

BACKGROUND

Solar arrays are devices that convert light energy into other forms of useful energy (e.g., electricity or thermal energy). One example of a solar array is a photovoltaic (PV) array that converts sunlight into electricity. Some photovoltaic arrays are configured to follow or track the path of the sun to minimize the angle of incidence between incoming sunlight and the photovoltaic array.

Photovoltaic array assemblies include a movable mounting system that supports and tilts the photovoltaic array and connects it to an anchoring structure. During use, the photovoltaic array may be exposed to environmental loads such as wind load, which can wear and cause damage to various components of the array. Such array assemblies typically include some type of damper system to absorb external forces acting on the array and prevent damage. Known damper systems provide a resistance force in response to external forces acting on the panel during normal operation. However, some such damper systems allow for flexing rotational movement of the panels and may therefore not be well suited to manage high intermittent loads acting on the panels. For example, during extreme weather events, such as a high wind event, it may be desirable to lock the panels in a flat orientation to reduce drag on the panels and prevent wear in the tracker system. Accordingly, a need exists for systems for damping photovoltaic arrays that provide traditional damping during normal operation yet also serve as a torsional locking mechanism during high load events.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a solar tracker system includes a torque tube, a column supporting the torque tube, a solar panel connected to the torque tube, and a damper assembly. The damper assembly includes a first end pivotably connected to the torque tube and a second end pivotably connected to the column. The damper assembly further includes an outer shell, a piston within the outer shell and moveable relative to the outer shell, a first chamber wall and a second chamber wall within the outer shell at least partially defining a chamber, and a valve within the chamber. The valve includes a first axial end defining a slot and the valve is biased to a first position within the chamber in which the first axial end is spaced from the first chamber wall. The valve is moveable within the chamber from the first position to a second position to passively change a flow resistance of the damper assembly.

In another aspect, a damper assembly for use in a solar tracker system includes an outer shell for pivotably connecting the damper assembly to a first portion of the solar tracker system and a piston for pivotably connecting the damper assembly to a second portion of the solar tracker system. The piston is within the outer shell and moveable relative to the outer shell. The damper assembly further includes a first chamber wall and a second chamber wall within the outer shell at least partially defining a chamber and a valve. The valve includes a first axial end defining a slot and is biased to a first position within the chamber in which the first axial end is spaced from the first chamber wall. The valve is moveable within the chamber from the first position to a second position to passively change a flow resistance of the damper assembly.

In yet another aspect, a solar tracker system includes a tube, a column supporting the tube, a solar panel assembly connected to the tube, and a damper assembly. The damper assembly includes a first end pivotably connected to the tube and a second end pivotably connected to the column. The damper assembly further includes an outer shell, a piston within the outer shell and moveable relative to the outer shell, and a first chamber wall and a second chamber wall within the outer shell at least partially defining a chamber, where movement of the piston relative to the outer shell directs a flow of fluid through the chamber. The damper assembly further includes a valve within the chamber and defining a slot therein. The valve is biased to a first position within the chamber and is moveable within the chamber from the first position to a second position to passively change a flow resistance of the damper assembly.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
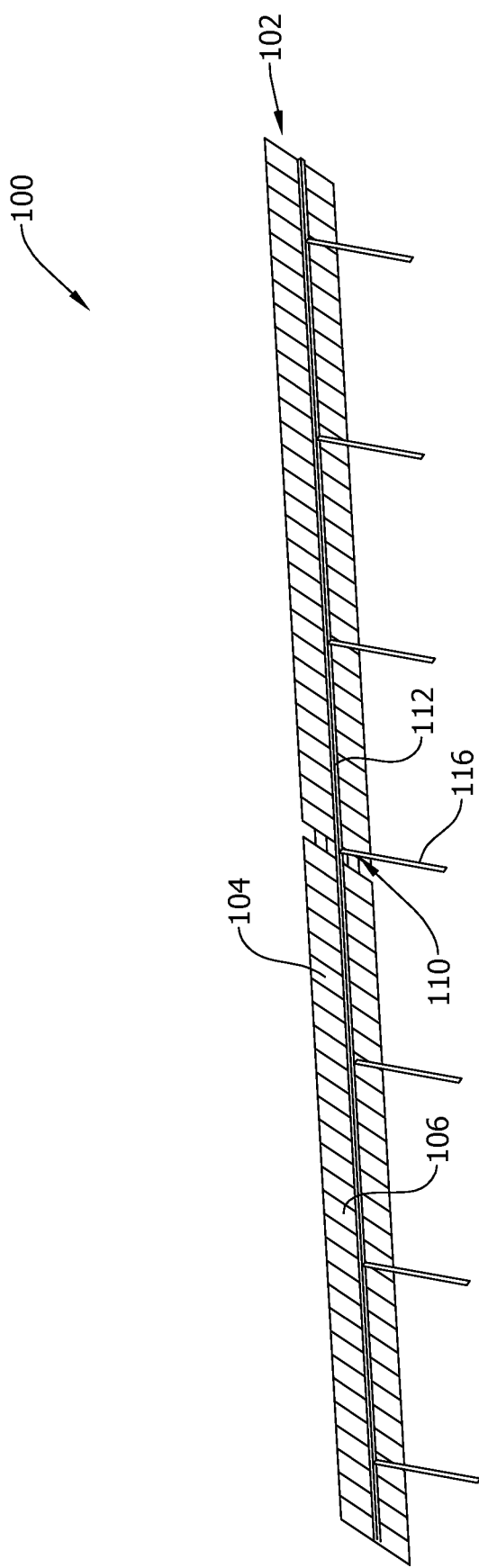
FIG. 1 is a perspective view of a solar array row.
Figure 2:
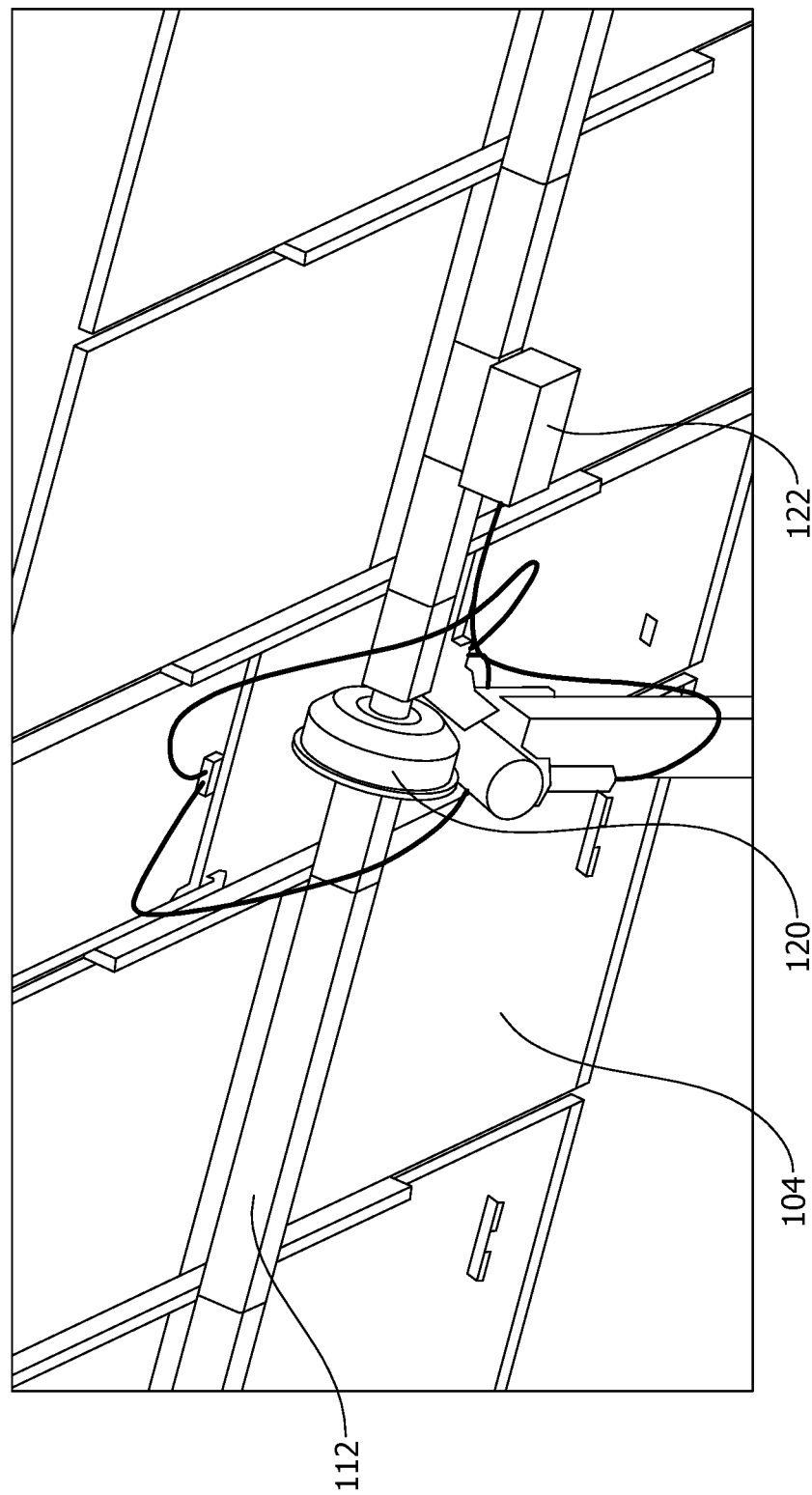
FIG. 2 is an enlarged perspective view of the solar array row of FIG. 1.

An example embodiment of a solar tracker system 100 including a PV solar array row 102 is shown in FIG. 1. The solar array row 102 may be used in a solar power generation system, such as the solar tracker 800 system shown schematically in FIG. 30. The solar array row 102 is used to generate power, typically in combination with a plurality of similarly arranged solar array rows 102 (not all rows shown). The solar array row 102 includes a plurality of solar panel assemblies 104. Each solar panel assembly 104 extends between a back side 106 and a panel side 108 (FIG. 2). The solar panel assemblies 104 are rectangular shaped. In other embodiments, the solar panel assemblies 104 may have any shape that allows the solar array row 102 to function as described herein.

The solar array row 102 includes a mounting assembly 110 that supports the plurality of solar panel assemblies 104. The mounting assembly 110 includes a torque tube 112 to which the solar panel assemblies 104 are connected. The solar panel assemblies 104 may be connected to the torque tube 112 by any suitable method including, for example, fasteners such as bolts and clips or by a clamping device. The solar panel assemblies 104 pivot about a rotational axis that extends through the torque tube 112 (i.e., extending into the page in FIGS. 4A-4C).

The torque tube 112 of this embodiment is pivotably connected to a plurality of support columns 116. In the illustrated embodiment, the support columns 116 are I-beam posts. Other support columns 116 may be used in other embodiments (e.g., a tubular support column 116). The support columns 116 may be connected to a base 118, shown as a foundation in the ground-mounted embodiment of FIGS. 4A-4C. Generally, any base that anchors the row may be used such as a frame member (e.g., a horizontal rail that the solar panel assemblies 104 with one or more posts securing the rail to the ground), stanchion, ram, pier, ballast, post or the like. The base 118 may be a foundation which encases a portion of the support columns 116 or may include brackets, fasteners or the like that connect to the support columns 116. In other embodiments, the row may be connected to another structure which supports the solar panels (e.g., roof-top applications).

The mounting assembly 110 also includes a drive 120 that adjusts the position of the solar panel assemblies 104. The drive 120 causes the torque tube 112 to pivot relative to the support columns 116. The drive 120 is disposed between the torque tube 112 and a base 118 (FIGS. 4A-4C) to which the support columns 116 are connected. The drive 120 in the embodiment of FIG. 2 is a slew drive, though the mounting assembly 110 may include any drive that enables the mounting assembly 110 to function as described herein.

Figure 31:
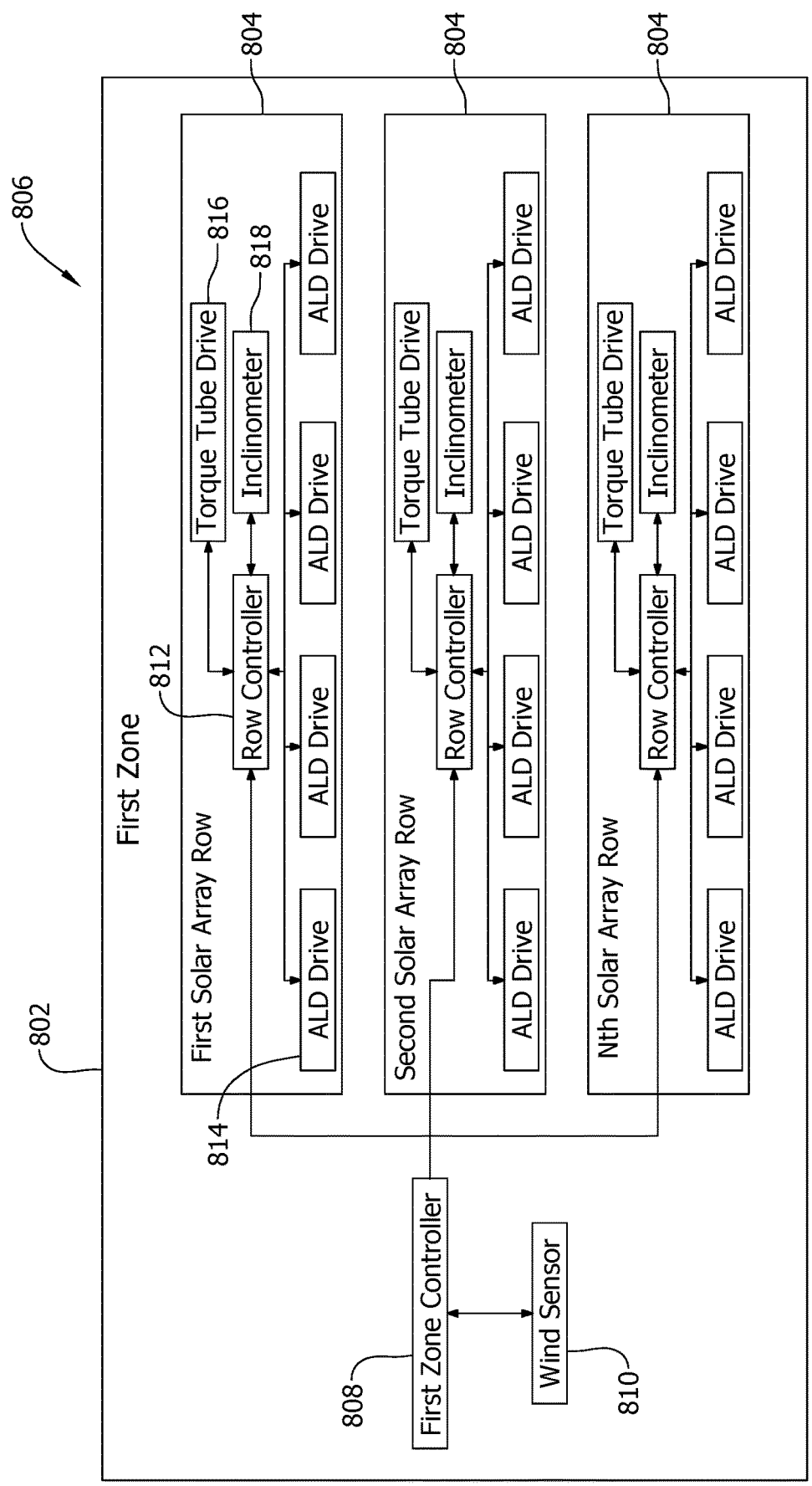
FIG. 31 is a schematic view of a control system for use in the solar tracker system of FIG. 30.

Referring to FIG. 2, the solar array row 102 includes a row controller assembly 122 that houses a row controller (FIG. 31). The row controller may be connected to the drive 120 and operable to control operation of the drive 120. The row controller adjusts the torque tube 112 such that the panel assemblies follow the path of the sun, such as during movement of the sun over a course of a day. In some embodiments, the row controller positions the panel assemblies based on seasonal variations in the position of the sun. The solar array row 102 may be a single axis tracker or a dual axis tracker with the torque tube 112 defining at least one axis of rotation of the array. The other axis of rotation may be a vertical axis with rotation being achieved by a rotatable coupling and, optionally, a second drive (not shown).

Figure 3:
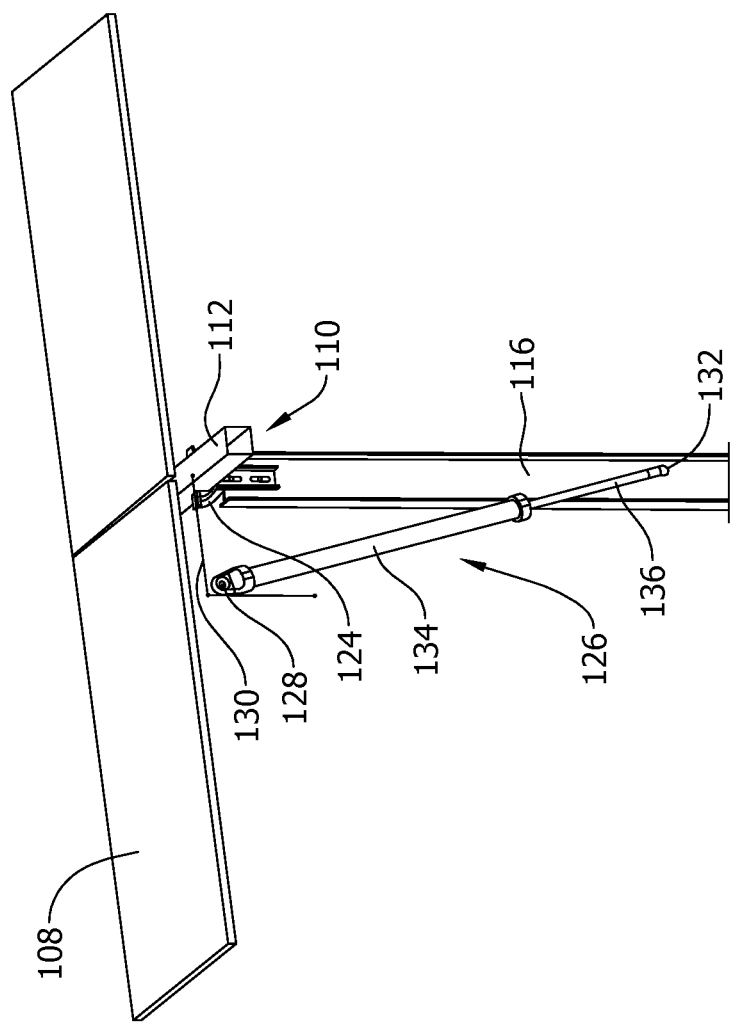
FIG. 3 is a partially schematic perspective view of a portion of the solar array row of FIG. 1.

Referring to FIG. 3, the solar panel assemblies are a photovoltaic array. In other embodiments, the solar panel assemblies 104 include a thermal collector that heats a fluid such as water. In such embodiments, the panel assemblies may include tubes of fluid which are heated by solar radiation. While the present disclosure may describe and show a photovoltaic array, the principles disclosed herein are also applicable to a solar array configured as a thermal collector unless stated otherwise.

The torque tube 112 of FIG. 3 is connected to the support column 116 via a pivoting member 124. The pivoting member 124 may include a bushing or bearing that rotates within a support coupled to the support column 116 to allow the torque tube 112 to rotate relative to the support column 116. In other embodiments, the pivoting member 124 is a roller bearing (e.g., ball bearing). The pivoting member 124 is also connected to the support column 116 by the support. Selective rotation of the torque tube 112 may allow for repositioning the solar panels to follow a position of the sun during use.

The mounting assembly 110 of FIG. 3 further includes a damper assembly 126 extending from a first end 128 pivotably coupled to a linkage member 130 (illustrated schematically in FIG. 3) to a second end 132 pivotably coupled to the support column 116. The damper assembly 126 includes an outer tube 134 extending from the first end 128. A piston 136 of the damper assembly 126 extends from the outer tube 134 to second end 132.

The damper assembly 126 of FIG. 3 applies a resistance force on the torque tube 112 in response to external loads applied to the solar array row 102. For example, during operation, the solar array row 102 may be subject to varying loads resulting from wind flow, precipitation, and other external forces surrounding the solar array row 102. As described in greater detail below, the damper assembly 126 is a hydraulic damper assembly 126 that contains a fluid which may resist movement of the piston 136 (shown in FIG. 4B) in response to such external forces to reduce stress and strain on the solar array row 102. More specifically, the damper assembly 126 reduces dynamic oscillations in the torque tube 112 resulting from external forces acting on the solar panels 104.

Figure 4C:
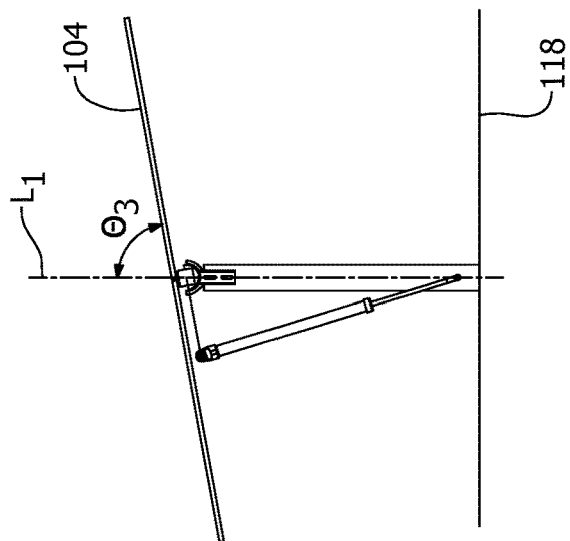
FIG. 4C is a schematic side view of the portion of the solar array row shown in FIG. 4A in a third orientation.
Figure 4B:
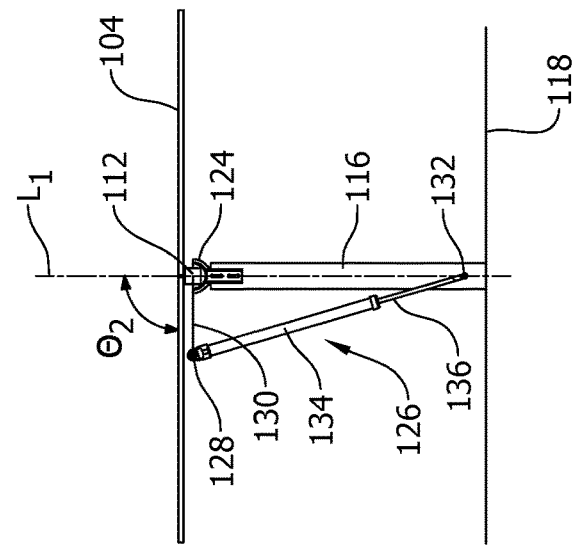
FIG. 4B is a schematic side view of the portion of the solar array row shown in FIG. 4A in a second orientation.
Figure 4A:
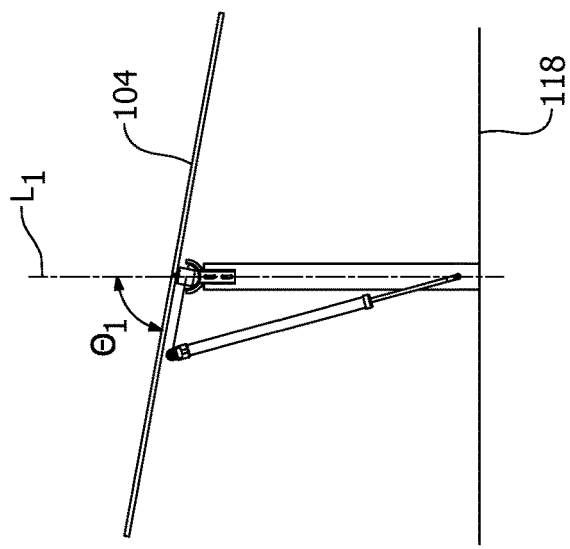
FIG. 4A is a schematic side view showing the portion of the solar array row shown in FIG. 3 in a first orientation.

FIGS. 4A-4C show a portion of the solar array row 102 with the solar panel assembly 104 in a first orientation, a second orientation, and a third orientation, respectively. The support column 116 defines a longitudinal axis $L_1$. More specifically, the support column 116 is coupled to the base 118 such that the longitudinal axis $L_1$ is generally perpendicular to the base 118 and a ground level (not shown). In other embodiments, the longitudinal axis $L_1$ of the support column 116 may be obliquely oriented relative to the base 118 and/or ground level.

The solar panel assembly 104 in the first orientation is oriented at a first oblique angle Si relative to the longitudinal axis $L_1$. In the second orientation, the solar panel assembly 104 is oriented at a second angle $\theta_2$ relative to the longitudinal axis $L_1$. In the third orientation, the solar panel assembly 104 is oriented at a third oblique angle $\theta_3$ relative to the longitudinal axis $L_1$, and in an opposite direction from the first orientation. In the illustrated embodiment, the first angle and third angle are approximately the same. More specifically, the first angle and the third angle are approximately 80 degrees and the second angle $\theta_2$ is approximately 90 degrees. The solar array row 102 is operable to orient the panel assembly about the rotational axis, by rotating the torque tube 112 relative to the support columns 116, such that the panel assembly is substantially vertical and faces a first direction and such that the panel assembly is substantially vertical and faces a second opposite direction. In other words, the panel assembly may be rotated such that the panel assembly is substantially parallel with the longitudinal axis $L_1$ and faces to the right of the page in FIG. 4A and such that the panel assembly is substantially parallel with the longitudinal axis $L_1$ and faces to the left of the page in FIG. 4C. In other embodiments the solar array row 102 may position the panel assemblies in any orientation that enables the solar array row 102 to function as described herein.

The solar panel assembly 104 in the second orientation of FIG. 4B is oriented approximately parallel with the base and ground level (also referred to herein as a "stowed position") and is substantially perpendicular to the longitudinal axis $L_1$. As a result, when in the stowed position, the panel assembly is also generally oriented in line with wind flow over the solar array row 102, thereby reducing drag and external forces on the solar array row 102. During operation, and as described in greater detail below, the solar array row 102 may be selectively controlled to move the solar panel assemblies 104 into the stowed position in response to determining that a detected wind speed exceeds a predetermined threshold. In other embodiments, such as, for example, where the support column 116 is oriented obliquely to a ground surface or where the ground surface is substantially inclined, the solar panel assembly 104 may be oriented obliquely to the longitudinal axis $L_1$ and substantially parallel to the ground surface in the stowed position. As described in greater detail below with respect to FIGS. 30-31, the solar array row 102 includes a control system which controls the solar array row 102 to move the panels into the stowed position in response to predetermined event. The control system is operable to determine an orientation of the panel assemblies and/or the solar array row 102. In particular, the control system determines that the assemblies are in the stowed position when they are within a +/−10-degree tolerance from the second orientation (i.e., perpendicular to the longitudinal axis $L_1$) such that the first orientation, the second orientation, and the third orientation all fall within the acceptable tolerance range of the stowed position.

As the panel assembly is moved between the first orientation and the third orientation, the piston 136 is retracted into the outer tube 134 of the damper assembly 126. In particular, when the panel assembly is in the first orientation of FIG. 4A, the first end 128 of the damper assembly 126 is positioned longitudinally above the torque tube 112. When the panel assembly is in the second orientation, the first end 128 of the damper assembly 126 is positioned substantially in longitudinal alignment with the torque tube 112. When the damper assembly 126 is in the third orientation, the first end 128 of the damper assembly 126 is positioned longitudinally below the torque tube 112.

Figure 5:
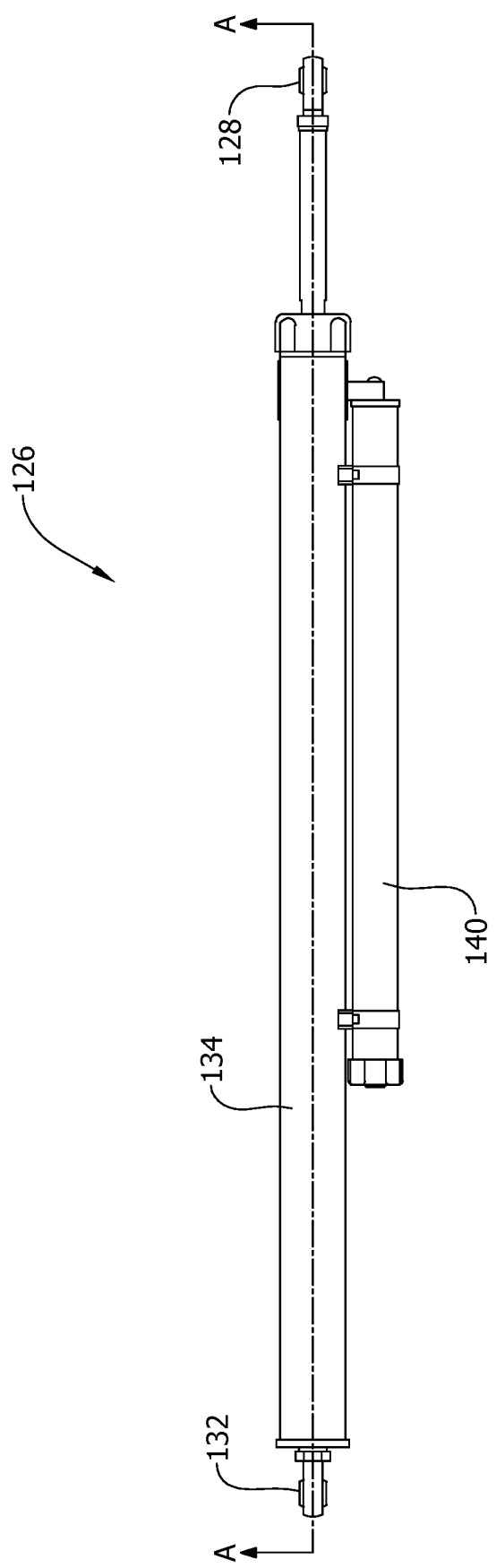
FIG. 5 is a side view of an embodiment of a damper assembly for use with the solar array row of FIG. 1.
Figure 6:
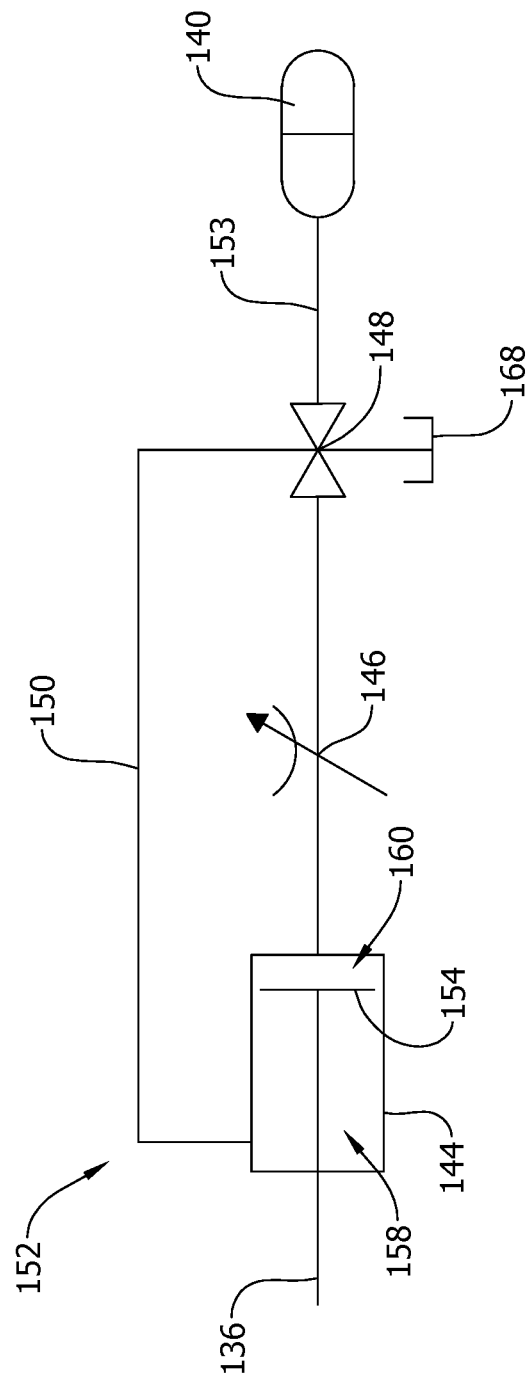
FIG. 6 is a hydraulic schematic of the damper assembly of FIG. 5.

FIG. 5 is a top view of the damper assembly 126 shown in FIG. 3. FIG. 6 is a hydraulic schematic of the damper assembly 126. The damper assembly 126 includes an accumulator assembly 140, also referred to herein as an "accumulator", attached to the outer tube 134, also referred to herein as an "outer shell". In other embodiments, the damper assembly 126 does not include an accumulator 140.

Referring to FIG. 6, the damper assembly 126 is a hydraulic damper and contains fluid therein that resists movement of the piston 136. The damper assembly 126 includes an inner tube 144, also referred to herein as an "inner shell", a binary damper valve assembly 146, an active damper lock 148, also referred to herein as a "locking valve," the accumulator assembly 140, and a return path 150 extending from the active damper lock 148 to the inner tube 144. A primary fluid circuit 152 is defined by the inner tube 144, the binary damper valve assembly 146, the active damper lock 148, and the return path 150. The primary fluid circuit 152 is configured for bidirectional (e.g., clockwise and counterclockwise in FIG. 6.) flow of fluid therethrough. An accumulator flow path 153 is defined between the accumulator 140 and the active damper lock 148 to provide fluid communication with the primary fluid circuit 152. The fluid used with the damper assembly 126 of FIG. 6 is a synthetic ester, though in other embodiments any suitable fluid may be used.

The piston 136 is received within the inner tube 144 and includes a piston seal 154 that seals against an interior wall of the inner tube 144 to inhibit fluid flow therethrough. As the piston 136 is moved within the inner tube 144 the piston seal 154 causes fluid to be displaced within the primary fluid circuit 152. For example, as the piston 136 is extended out of the inner tube 144, fluid on a first side 158 of the piston seal 154 is directed out of the inner tube 144 and into the return path 150, thereby pushing fluid through the active damper lock 148, the binary damper valve assembly 146, and into the inner tube 144 on a second side 160 of the piston seal 154. Likewise, as the piston 136 is retracted into the inner tube 144, the piston 136 pushes fluid in the inner tube 144 on the second side 160 of the piston seal 154 through the binary damper valve assembly 146, the active damper lock 148, and the return path 150 into the inner tube 144.

The binary damper valve assembly 146 of this embodiment passively changes flow resistance of the primary fluid circuit 152 by transitioning between a high resistance state and a low resistance state based on the velocity of the piston 136. In particular, during operation, as movement of the piston 136 within the inner tube 144 is increased, a velocity of fluid flow through binary damper valve assembly 146 is also increased. As described in greater detail with respect to FIGS. 10-15, the binary damper valve assembly 146 includes a bidirectional binary valve 162 and a biasing assembly 164 which biases the binary valve 162 to the low resistance state. When the piston 136 velocity exceeds a threshold value, fluid flow through the binary valve 162 applies an increased force on the valve that overcomes the biasing assembly 164 and moves the binary valve 162 to the high resistance state. Likewise, as the piston 136 velocity decreases below the threshold value, the biasing assembly 164 overpowers the fluid force acting on the valve and transition the binary valve 162 back to the low resistance state.

Accordingly, the binary damper valve assembly 146 of the FIG. 6 embodiment is "binary", in that it transitions between two states, specifically the high resistance state and the low resistance state, in response to the piston 136 velocity crossing the threshold value. Additionally, the binary damper valve assembly 146 is a passive valve, in that it transitions between the two states in response to forces acting on the damper assembly 126 and is not selectively controlled. In other embodiments, the binary damper valve assembly 146 includes any type of valve that enables the binary damper valve assembly 146 to function as described herein. For example, and without limitation, in some embodiments, the binary damper valve assembly 146 is a shim valve.

The threshold piston 136 speed is suitably set or controlled between approximately 0.01 cm/s and 100 cm/s, or approximately 0.1 cm/s and 10 cm/s, or approximately 0.5 cm/s and 5 cm/s. In the embodiment of FIG. 5, the binary damper valve assembly 146 is moved to the high resistance state when a velocity of the piston 136 is greater than approximately 1 cm/s (i.e., 0.01 m/s). In other embodiments, the binary damper valve assembly 146 may be selectively controlled to transition between the high resistance and low resistance states (e.g., via an electronically controlled actuation device and/or manual actuation).

When the binary damper valve assembly 146 is in the low resistance state, the damper assembly 126 may provide a resistance force of between approximately 0 and 5 kilonewtons. More specifically, in the embodiment of FIG. 6, when the binary damper valve assembly 146 is in the low resistance state, the damper assembly 126 provides a resistance force of near zero kilonewtons. When the binary damper valve assembly 146 is in the high resistance state, the damper assembly 126 may provide a resistance force of between approximately 5 and 35 kilonewtons, between 10 and 30 kilonewtons, or between 15 and 25 kilonewtons. More specifically, in the embodiment of FIG. 6, when the binary damper valve assembly 146 is in the high resistance state, the damper assembly 126 provides a resistance force of approximately 20 kilonewtons. In other words, when the binary damper valve assembly 146 is in the high resistance state, the damper assembly 126 resists axial movement of the piston 136 by axial loads on the piston 136 less than approximately 20 kilonewtons. In other embodiments, the damper assembly 126 provides any resistance force when the binary damper valve assembly 146 is in the high resistance state or in the low resistance state that enables the damper assembly 126 to function as described herein.

The active damper lock 148 of FIG. 6 selectively closes off the flow path between the return path 150 and the binary damper valve assembly 146. As described in greater detail with respect to FIG. 16, the active damper lock 148 includes a spool valve that is selectively controllable by an external drive 168 (e.g., a motor and/or manual actuation) to move the active damper lock 148 between a sealed state, in which fluid flow between the binary damper valve assembly 146 and the return path 150 is blocked, and an unsealed state in which fluid is allowed to flow between the binary damper valve assembly 146 and the return path 150. As described in greater detail with respect to FIGS. 31-37, the damper assembly 126 may include various electronics for selectively controlling the active damper lock 148, or more specifically, the drive 168, to move the active damper lock 148 between the sealed state and the unsealed state.

When the active damper lock 148 is in the sealed state, the damper assembly 126 may provide a resistance force of between approximately 5 and 100 kilonewtons, between approximately 25 and 75 kilonewtons, and/or between approximately 35 and 65 kilonewtons. More specifically, in the embodiment of FIG. 6, when the active damper lock 148 is in the sealed state, the damper assembly 126 provides a resistance force of approximately 50 kilonewtons. In other embodiments, the damper assembly 126 provides any resistance force when the active damper lock 148 is in the sealed state that enables the damper assembly 126 to function as described herein.

The accumulator 140 is coupled in flow communication with the primary fluid circuit 152 by an accumulator flow path 153 to receive and contain excess fluid from the primary fluid circuit 152. For example, as described above, during operation, the damper assembly 126 provides resistance to movement of the piston 136 within the inner tube 144 by restricting fluid flow from the first side 158 of piston 136 to the second side 160. When the piston 136 is fully extended from the tube, the primary fluid circuit 152 contains a first volume of fluid. However, as the piston 136 is retracted into the inner tube 144 (e.g., as a result of pivoting the solar panel assemblies 104 on the torque tube 112), at least a portion of the first volume of fluid is displaced from the primary fluid circuit 152 to receive the added volume of the retracted piston 136. The accumulator 140 provides a reservoir for excess fluid that is displaced from the primary fluid circuit 152 by the added volume of the piston 136 in the inner tube 144. In other embodiments, the damper assembly 126 does not include the accumulator 140 or the accumulator flow path 153.

Figure 7:
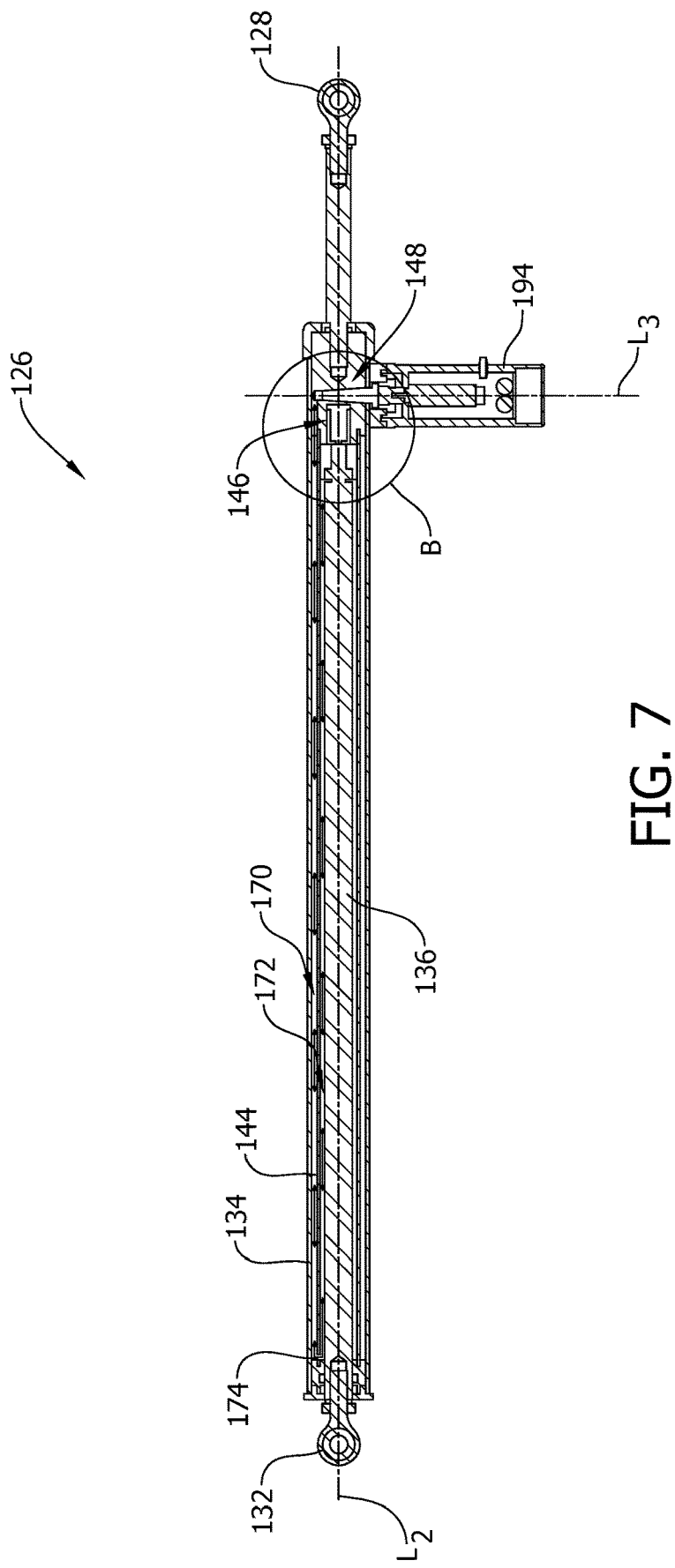
FIG. 7 is a cross-sectional view of the damper assembly of FIG. 5 taken along the line A-A of FIG. 5.

FIG. 7 is a cross sectional view of the damper assembly 126 taken along the line A-A shown in FIG. 5. Flow lines, as used throughout the figures, indicate fluid flow through the damper assembly 126.

The outer tube 134 circumscribes the inner tube 144 and defines an outer fluid channel 170 extending radially between the outer tube 134 and the inner tube 144. An inner fluid channel 172 is defined radially between the piston 136 and the inner tube 144. The inner fluid channel 172 and the outer fluid channel 170 are in fluid communication via at least one aperture 174 defined in the inner tube 144. In particular, in the embodiment of FIG. 7, a plurality of apertures 174 are defined in the inner tube 144 proximate the second end 132 of the damper assembly 126. In other embodiments, fluid communication between the inner fluid channel 172 and the outer fluid channel 170 is provided in any manner that enables the damper assembly 126 to function as described herein.

The piston 136 of FIG. 7 is shown fully retracted within the inner tube 144. During operation, extension of the piston 136 from the inner tube 144 (e.g., to the left of the page as shown in FIG. 7) causes the piston seal 154 (FIG. 13) to move relative to the inner tube 144 and displaces fluid within the inner fluid channel 172 towards the second end 132. Fluid in the outer fluid channel 170 is caused to be displaced towards the first end 128. When the piston 136 is retracted into the inner tube 144 from an extended position, the piston seal 154 and fluid within the inner fluid channel 172 are displaced towards the first end 128. Fluid in the outer fluid channel 170 is displaced toward the second end 132.

Figure 8:
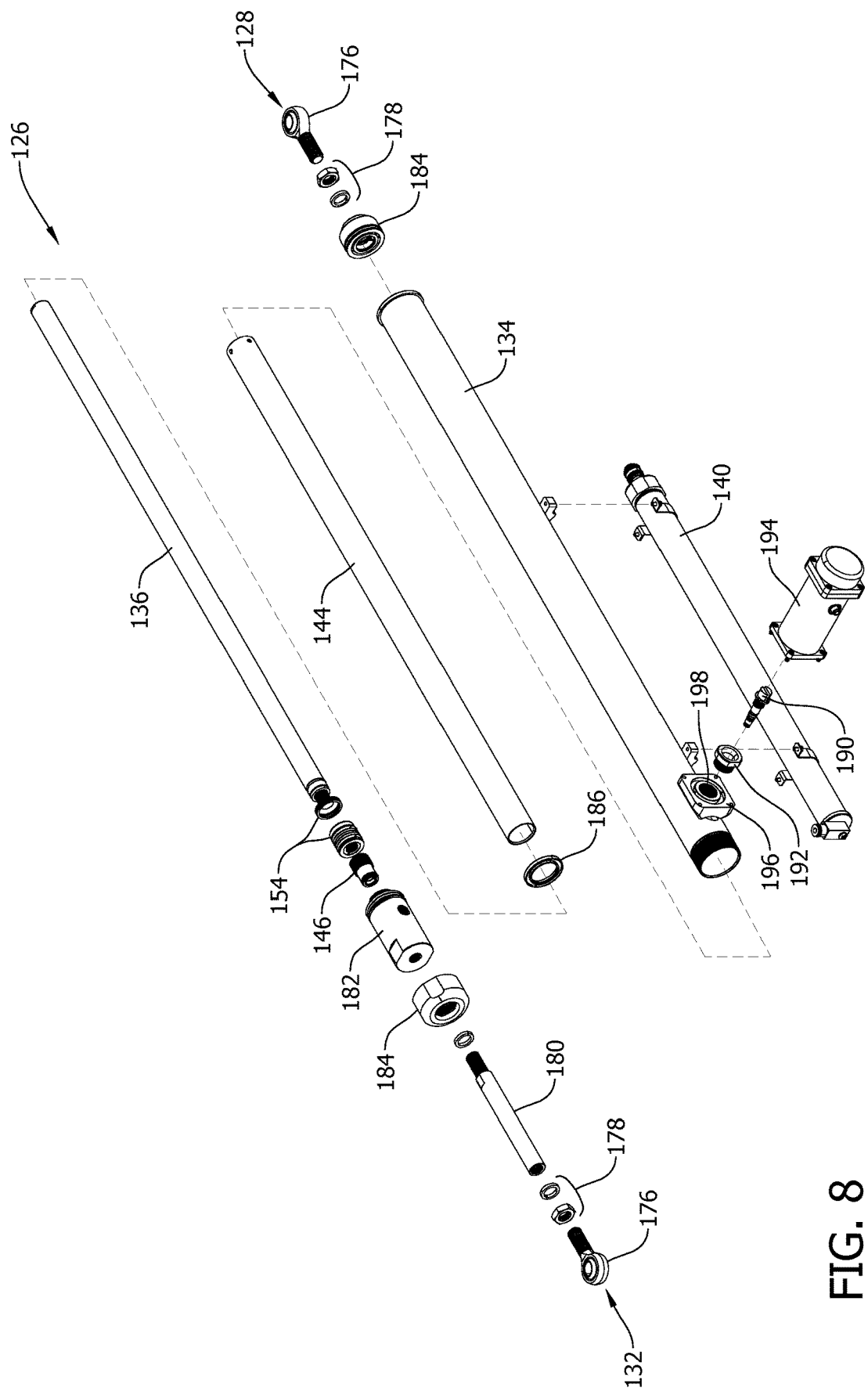
FIG. 8 is an exploded view of the damper assembly of FIG. 5.

FIG. 8 is an exploded view of the damper assembly 126. The first and second ends 128, 132 each include joints 176 which facilitate pivotably coupling the damper assembly 126 to the linkage and the support column 116. In the embodiment of FIG. 8, the joints 176 are ball joints 176, though other joints 176 may be used in other embodiments. A pair of fasteners 178 connect the joint at the first end 128 to a mounting shaft 180. The mounting shaft 180 is threaded for threadable attachment to a lock housing 182. An end cap 184 is included that circumscribes the mounting shaft 180 and retain the joint.

The damper assembly 126 further includes the binary damper valve assembly 146, the piston seal 154, the piston 136, the inner tube 144, an inner tube retainer 186, the outer tube 134, a lock shaft 190, a lock shaft retainer 192, a controller assembly 194, and the accumulator 140. The outer tube 134 includes an active lock plate 196 which defines an aperture 198 sized to receive the lock shaft 190 therein. The controller assembly 194 removably attaches to the active lock plate 196 and is sized to house electronics and the drive 168 (FIG. 6) for controlling the active damper lock 148 therein. The drive 168 (FIG. 6) operably engages the lock shaft 190 to drive movement of the lock shaft 190.

The controller assembly 194 is removably attachable to the outer tube 134 (e.g., via fasteners) and extends outward therefrom, as shown in FIG. 7. The controller assembly 194 also covers the active damper lock 148, which defines a lock axis $L_3$, also referred to herein as an "extension axis", that is generally perpendicular to the longitudinal axis $L_2$ of the damper assembly 126. The controller assembly 194 is oriented to extend outward from the outer tube 134 generally parallel to the lock axis $L_3$. Accordingly, the controller assembly 194 is positioned on the outer tube 134 to facilitate manually accessing the lock shaft 190 when the controller assembly 194 is removed. For example, during operation, the controller assembly 194 may be removed by an operator to facilitate servicing the lock shaft 190 and/or seals on the lock shaft 190. Removing the controller assembly 194 also allows an operator to manually transition the active damper lock 148 between the sealed and unsealed states.

Figure 9:
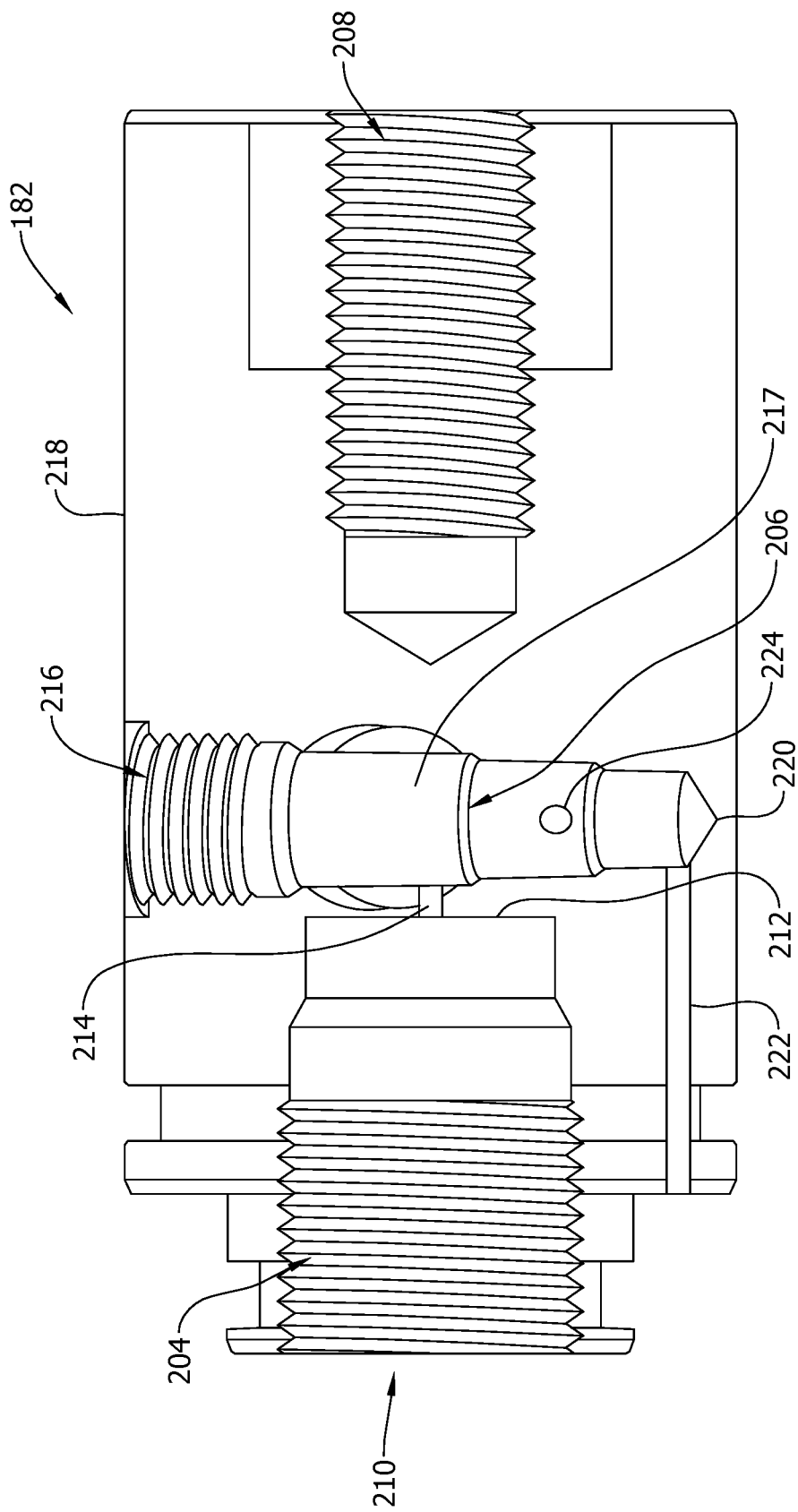
FIG. 9 is a cross-sectional view of the of a lock housing shown in the damper assembly of FIG. 8.

FIG. 9 is a sectional view of the lock housing 182. The lock housing 182 defines a binary damper valve chamber 204, an active lock chamber 206 defined by a chamber wall 217, and an aperture 208 for receiving the mounting shaft 180 (FIG. 8) therein.

Figure 13:
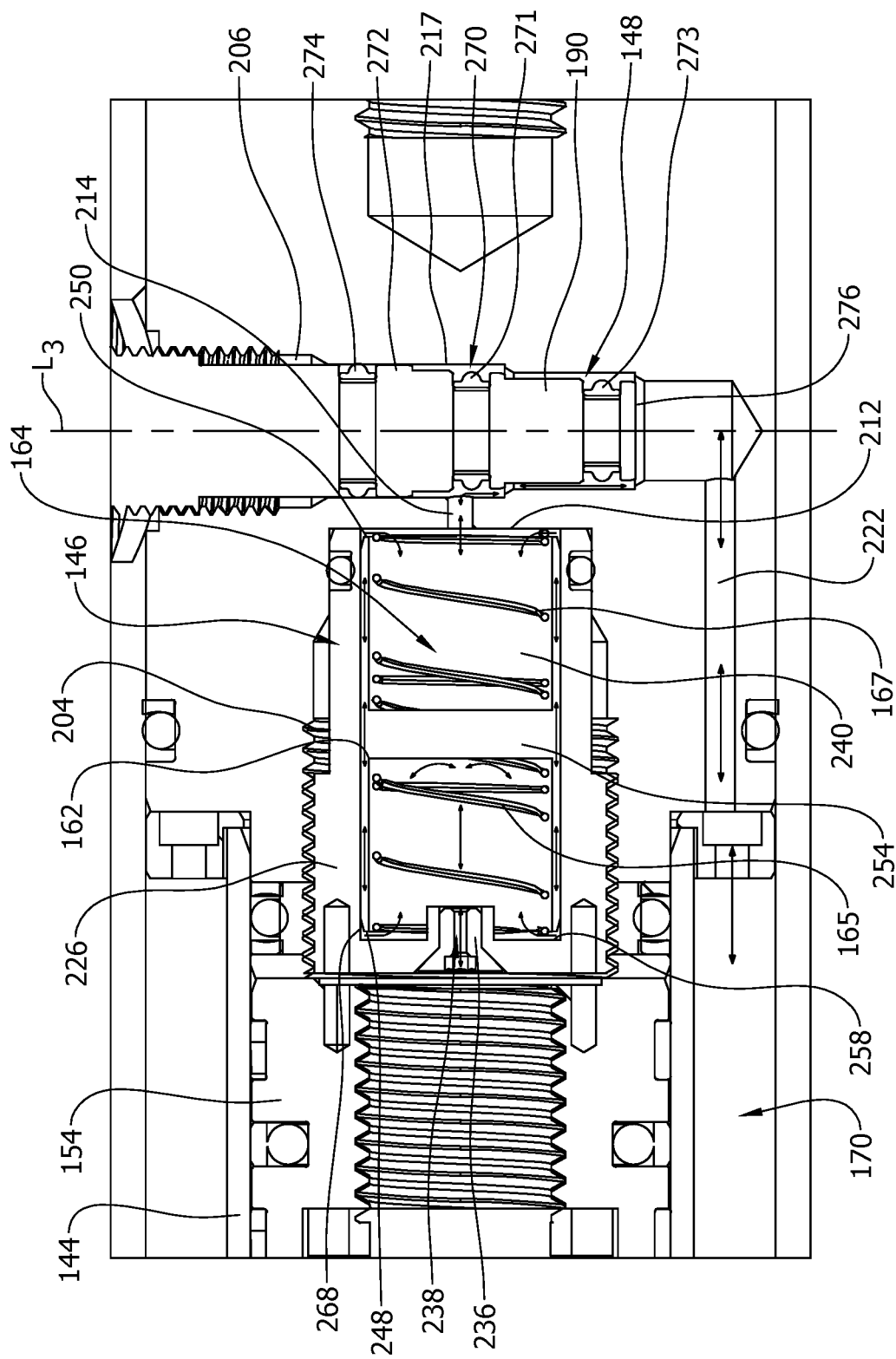
FIG. 13 is an enlarged view of the region B shown in FIG. 7.

The binary damper valve chamber 204 is sized to threadably receive the binary damper valve assembly 146 (FIG. 10) therein. The active lock chamber 206 is sized to receive the lock shaft 190 therein. The binary damper valve chamber 204 extends between a front opening 210 for fluid communication with the inner tube 144 (e.g., as shown in FIG. 13) to a rear face 212. A first passageway 214 is defined in the rear face 212 and extends to the active lock chamber 206 to provide fluid communication between the binary damper valve chamber 204 and the active lock chamber 206.

The active lock chamber 206 extends from an opening 216 in an outer circumferential surface 218 of the lock housing 182 to a distal end 220. A second passageway 222 provides fluid communication between the active lock chamber 206 and the outer fluid channel 170 (shown in FIG. 13). A third passageway 224 extends to from the lock housing 182 (into the page in FIG. 9) to the outer circumferential surface 218 to provide fluid communication between the active lock chamber 206 and the accumulator 140 (FIG. 8).

Figure 10:
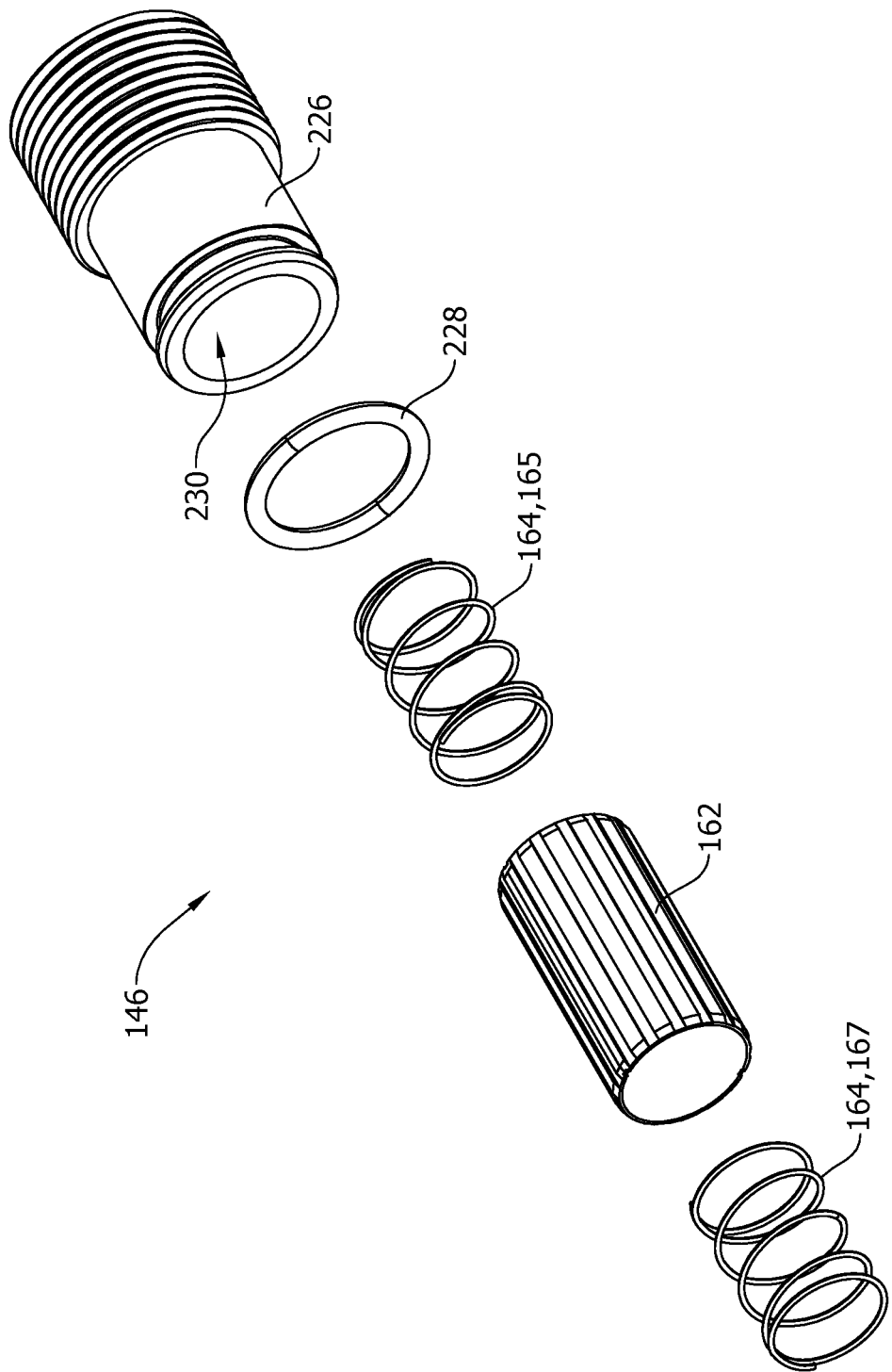
FIG. 10 is an exploded view of the binary damper valve assembly shown in the damper assembly of FIG. 8.
Figure 11:
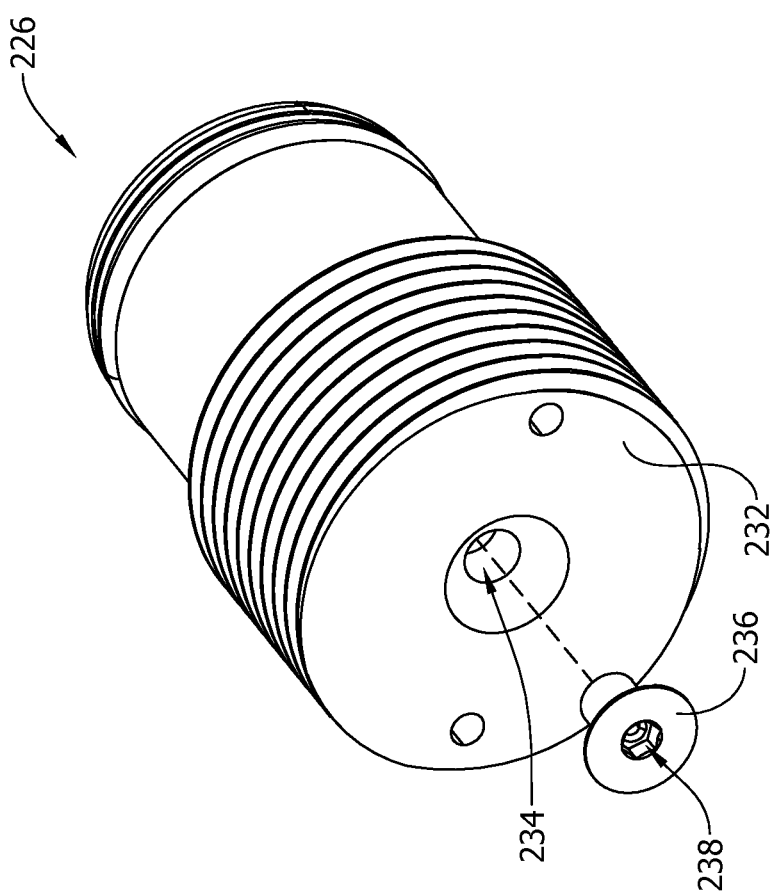
FIG. 11 is an exploded view of a valve body of the binary damper valve assembly of FIG. 10.
Figure 12:
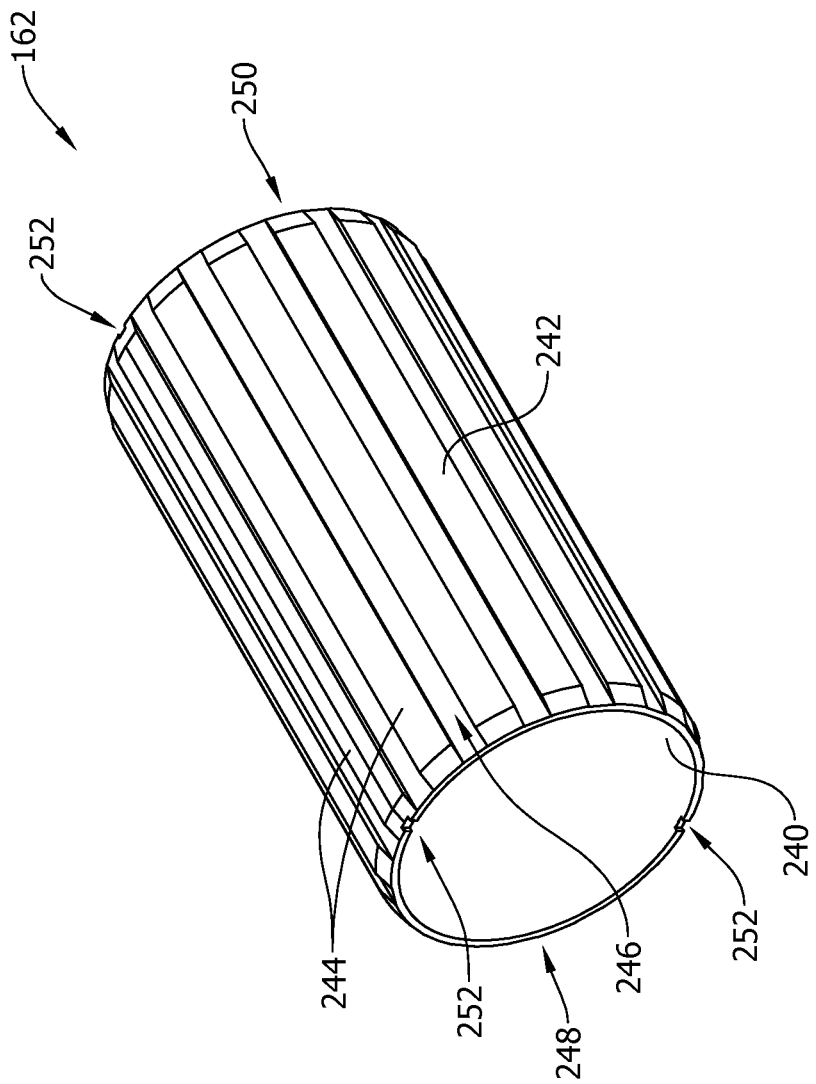
FIG. 12 is a perspective view of the binary valve of the binary damper valve assembly of FIG. 10.

FIG. 10 is an exploded view of the binary damper valve assembly 146. FIG. 11 is an exploded view of a valve body 226, also referred to herein as a "valve jacket", of the binary damper valve assembly 146. FIG. 12 is a perspective view of the binary valve 162 of the binary damper valve assembly 146.

The binary damper valve assembly 146 includes the binary valve 162, a biasing assembly 164 that includes a first biasing element 165 and a second biasing element 167, the valve body 226, and a seal 228. The biasing elements 165, 167 of this embodiment are compression springs and the seal 228 is an O-ring. In other embodiments, the binary damper valve assembly 146 includes any suitable biasing elements 165, 167 and seal 228 that enables the binary damper valve assembly 146 to function as described.

The valve body 226 defines a tunnel 230 sized to receive the binary valve 162 therein. Referring to FIG. 11, the valve body 226 includes a front face 232 that is oriented to face the piston seal 154 (e.g., as shown in FIG. 13). A tunnel channel 234 is defined within the front face 232 and extends to the tunnel 230 (FIG. 10). The tunnel channel 234 is threaded to receive a threaded channel member 236. The threaded channel member 236 defines a channel 238 therethrough. During use, fluid flow between the front face 232 and the tunnel 230 is directed through the channel 238 in the threaded channel member 236. Accordingly, the valve body 226 facilitates adjustment of flow resistance between the front face 232 and the tunnel 230. For example, an operator may adjust the flow resistance between the front face 232 and the tunnel 230 by replacing the threaded channel member 236 with a different channel member having a different sized channel 238 that causes a desired flow resistance therethrough. In other embodiments, the valve body 226 does not include the threaded channel member 236.

Referring to FIG. 12, the binary valve 162 is generally annular and extends between an inner surface 240 and an outer surface 242. The outer surface 242 includes a plurality of circumferentially spaced ridges 244 that extend from the first axial end 248 to the second axial end 250 and define a plurality of circumferentially spaced channels 246 therebetween. The channels extend an axial length of the outer surface 242 between a first axial end 248 and a second axial end 250 of the binary valve 162. A plurality of slots 252 are defined in the first and second axial ends 248, 250. In the embodiment of FIG. 12, each end defines two circumferentially opposed slots 252. In other embodiments, the binary valve 162 defines any number of slots 252 that enables the binary valve 162 to function as described herein.

The binary valve 162 includes a suitable material such as a polymer material. For example, the binary valve 162 is made or formed of Delrin plastic. (Delrin is a registered trademark of E.I. Du Pont De Nemours and Company corporation). In other embodiments, the binary valve 162 is made of any material that enables the binary damper valve assembly 146 to function as described herein.

FIG. 13 is an enlarged view of the region B, shown in FIG. 7, with the active damper lock 148 in the unsealed state and the binary damper valve assembly 146 in the low resistance state. The valve body 226 is received within the binary damper valve chamber 204 and the binary valve 162 is received within the tunnel 230 (FIG. 10) of the valve body 226. The binary valve 162 includes intermediate sidewalls 254 extending radially across the inner surface 240 of the binary valve 162.

The biasing assembly 164 biases the binary valve 162 within the valve body 226 to the low resistance state. In particular, the biasing elements 165, 167 are each positioned within the binary valve 162 to engage the intermediate sidewalls. More specifically, the first biasing element 165 engages a tunnel face 258 of the valve body 226 and a first intermediate sidewall 254 of the binary valve 162. The second biasing element 167 engages the rear face 212 of the binary damper valve chamber 204 and the first intermediate sidewall 254 of the binary valve 162. Collectively, the biasing elements 165, 167 bias the binary valve 162 within the valve body 226 such that the first axial end 248 of the binary valve 162 is spaced from the tunnel face 258 and the second axial end 250 is spaced from the rear face 212. In other embodiments, the binary valve 162 includes a plurality of intermediate sidewalls and the biasing elements 165, 167 each engage and contact a different sidewall.

During operation, with the binary damper valve assembly 146 in the low resistance state, as the piston 136 retracts into the inner tube 144, fluid between the piston seal 154 and the lock housing 182 is directed from the inner tube 144 through the channel in the threaded channel member 236 and into the tunnel 230. The fluid flow entering the tunnel 230 applies pressure on the intermediate sidewall 254 of the binary valve 162. The fluid flow within the binary valve 162 is directed radially outward between the first axial end 248 of the binary valve 162 and the tunnel face 258 and axially along the outer surface 242 of the binary valve 162 within the channels (FIG. 12). In particular, the binary valve 162 is positioned within the valve body 226 such that the ridges 244 (FIG. 12) contact an inner tunnel surface 266 (FIG. 14) of the valve body 226 and the channels provide axially extending channels along which fluid may flow between the first axial end 248 and the second axial end 250. The fluid is then directed between a gap defined between the second axial end 250 of the binary valve 162 and the rear face 212 of the binary damper valve chamber 204 and through the first passageway 214. Although the fluid flow is described herein with respect to retraction of the piston 136, it should be understood that extension of the piston 136 from the inner tube 144 will cause the fluid to flow through the binary damper valve chamber 204 in substantially the same manner but in the opposite direction.

The active damper lock 148 is suitably a spool valve that includes the lock shaft 190 received within the active lock chamber 206 to define the longitudinal lock axis $L_3$. The lock shaft 190 defines a recessed region 270 that is aligned with the second fluid passageway when the active damper lock 148 is in the unsealed state. The lock shaft 190 further defines an abutment 272, also referred to herein as a "radial projection", having a circumference that is greater than the circumference of the lock shaft 190 at the recessed region 270. In particular, the abutment 272 is sized to contact the active lock chamber 206 and inhibit fluid flow longitudinally therethrough. The active lock further includes seals 271, 273, 274 attached to the lock shaft 190. The seals include a first seal 271 that is generally aligned with the first passageway 214 and spaced from the chamber wall 217 when the active damper lock 148 is in the unsealed state. A second seal 273 is included adjacent a distal end 276 of the lock shaft 190. A third seal 274 is included longitudinally above the first seal 271 and the abutment 272 to further prevent fluid from flowing longitudinally above the third seal. In other embodiments, the active damper lock 148 may include any valve that enables the active damper lock 148 to function as described herein.

During operation, when the active damper lock 148 is in the unsealed state and the piston 136 is caused to retract into the inner tube 144, fluid flow from the first passageway 214 is directed into the recessed region 270 between the lock shaft 190 and the active lock chamber 206. The fluid is further directed longitudinally toward the distal end 276 of the lock shaft 190 and into the second passageway 222. At least some of the fluid may further be directed into the third passageway 224 (FIG. 9) and into the accumulator 140 (FIG. 8). From the second passageway 222 the fluid is directed into the outer fluid channel 170.

Figure 14:
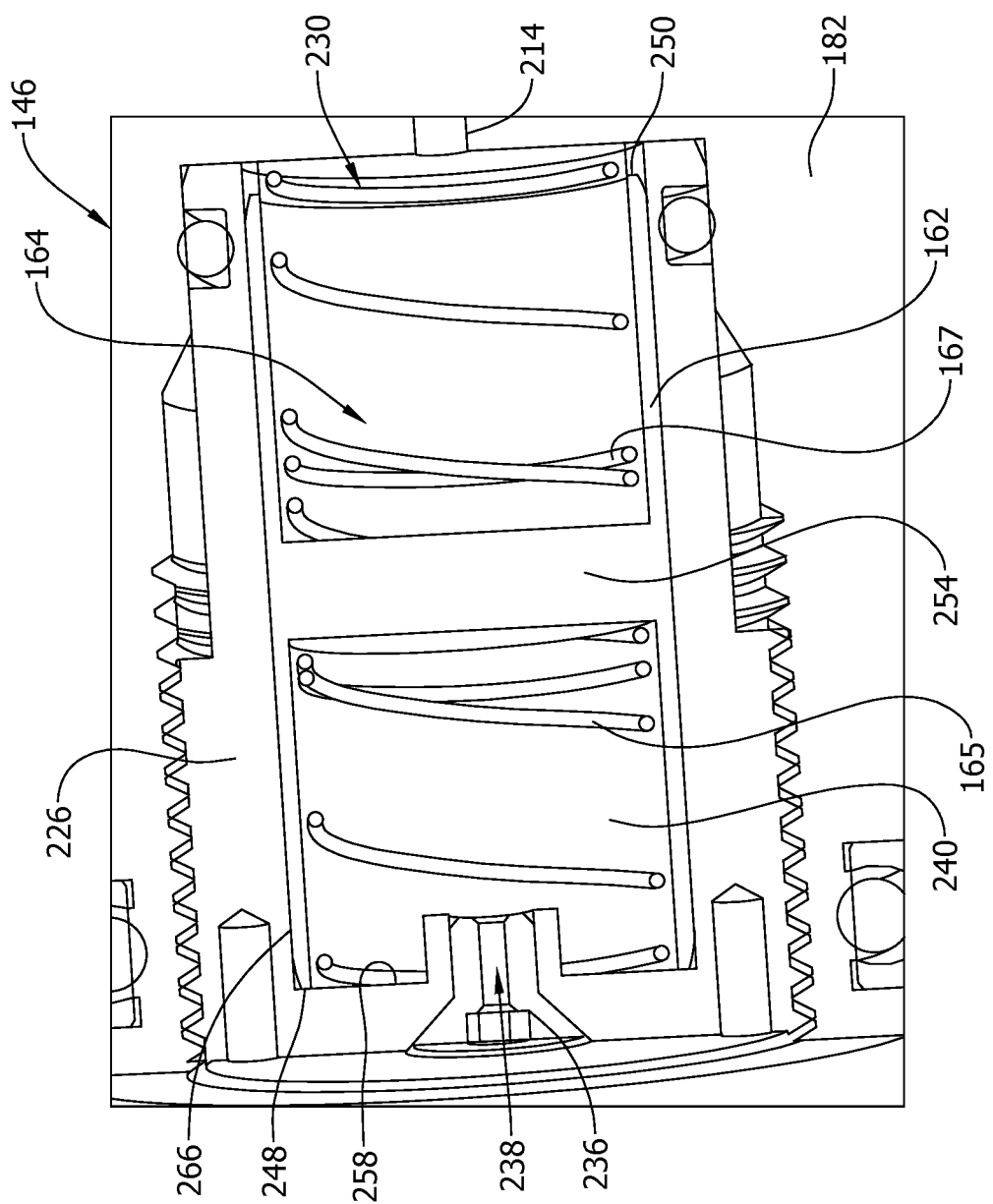
FIG. 14 is an enlarged view of the region B shown in FIG. 7, showing the binary damper valve assembly in a first high resistance state.
Figure 15:
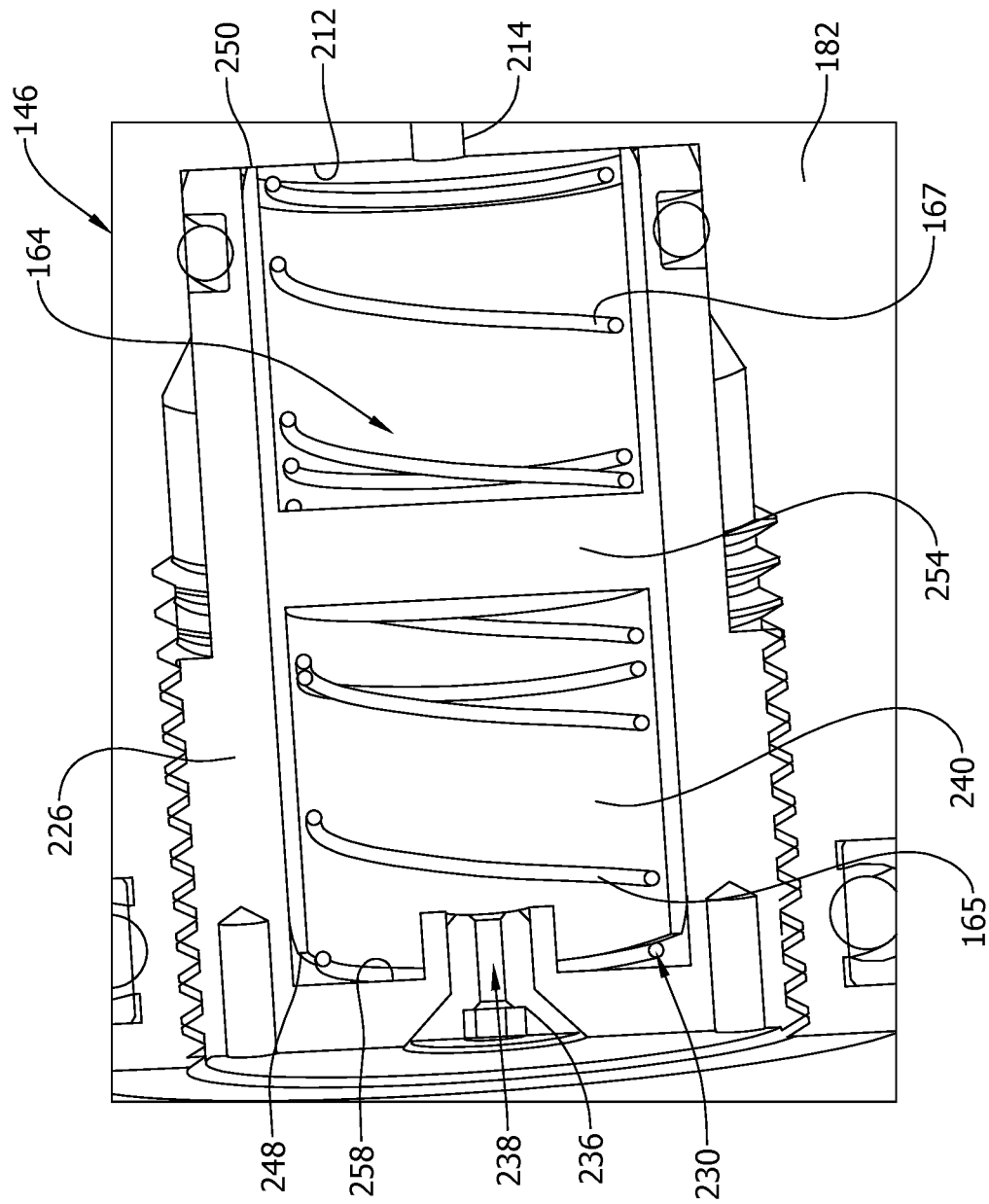
FIG. 15 is an enlarged view of the region B shown in FIG. 7, showing the binary damper valve assembly in a second high resistance state.

FIGS. 14 and 15 show the binary damper valve assembly 146 in the high resistance state. In particular, FIG. 14 shows the binary damper valve assembly 146 in the high resistance state due to increased piston 136 velocity extending from the inner tube 144 and FIG. 15 shows the binary damper valve assembly 146 in the high resistance state due to increased piston 136 velocity retracting into the inner tube 144.

Referring to FIG. 14, as the piston 136 is extended from the inner tube 144 (FIG. 13), fluid is directed from the first passageway 214 into the tunnel 230 of the valve body 226 and the inner surface 240 of the binary valve 162 to the intermediate sidewall. As the piston 136 velocity is increased, the pressure applied by the fluid flow on the intermediate sidewall 254 is also increased. When the piston 136 velocity exceeds the threshold, the fluid pressure overcomes the biasing force acting on the binary valve 162, thereby pushing the binary valve 162 axially within the tunnel 230 such that the first axial end 248 contacts the tunnel face 258. With the first axial end 248 contacting the tunnel face 258, the fluid flow through the tunnel 230 is restricted to flow through the slots 252 (FIG. 12) defined in the first axial end 248 of the binary valve 162.

Similarly, referring to FIG. 15, as the piston 136 is retracted into the inner tube 144 (FIG. 13), fluid is directed through the channel 238 in the threaded channel member 236 into the tunnel 230 of the valve body 226 and the inner surface 240 of the binary valve 162 to the intermediate sidewall. As the piston 136 velocity is increased, the pressure applied by the fluid flow on the intermediate sidewall 254 is also increased. When the piston 136 velocity exceeds the threshold, the fluid pressure overcomes the biasing force acting on the binary valve 162, thereby pushing the binary valve 162 axially within the tunnel 230 such that the second axial end 250 contacts the rear face 212. With the second axial end 250 contacting the rear face 212, fluid flow through the tunnel 230 is restricted to flowing through the slots 252 (FIG. 12) defined in the second axial end 250 of the binary valve 162. Restricting the fluid to flow through the slots 252 increases the total resistance applied by the damper assembly 126.

In one alternative embodiment, the inner surface 240 of the binary valve 162 may include one or more flow features (not shown) for reducing turbulent fluid flow and eddy currents within the binary valve 162. For example, in one alternative embodiment, the binary valve 162 includes inner ridges 244 (not shown) protruding radially inward from the inner surface 240 and extending axially of the binary valve 162. In the alternative embodiment, the inner ridges 244 define inner channels therebetween for directing fluid flow from the intermediate sidewalls 254 to the corresponding axial ends and along the outer surface 242 (FIG. 12) of the binary valve 162. Accordingly, the channels and/or other flow features reduce interaction between an outer radial fluid flow (e.g., flowing from the intermediate sidewalls 254 to the axial ends) and an inner radial fluid flow (e.g., flowing into the binary valve 162 and to the intermediate sidewall), to reduce turbulence and the generation of eddy currents. In other embodiments, the inner surface 240 and/or intermediate sidewalls 254 of the binary valve 162 include any flow features that enable the binary damper valve assembly 146 to function as described herein.

Figure 16:
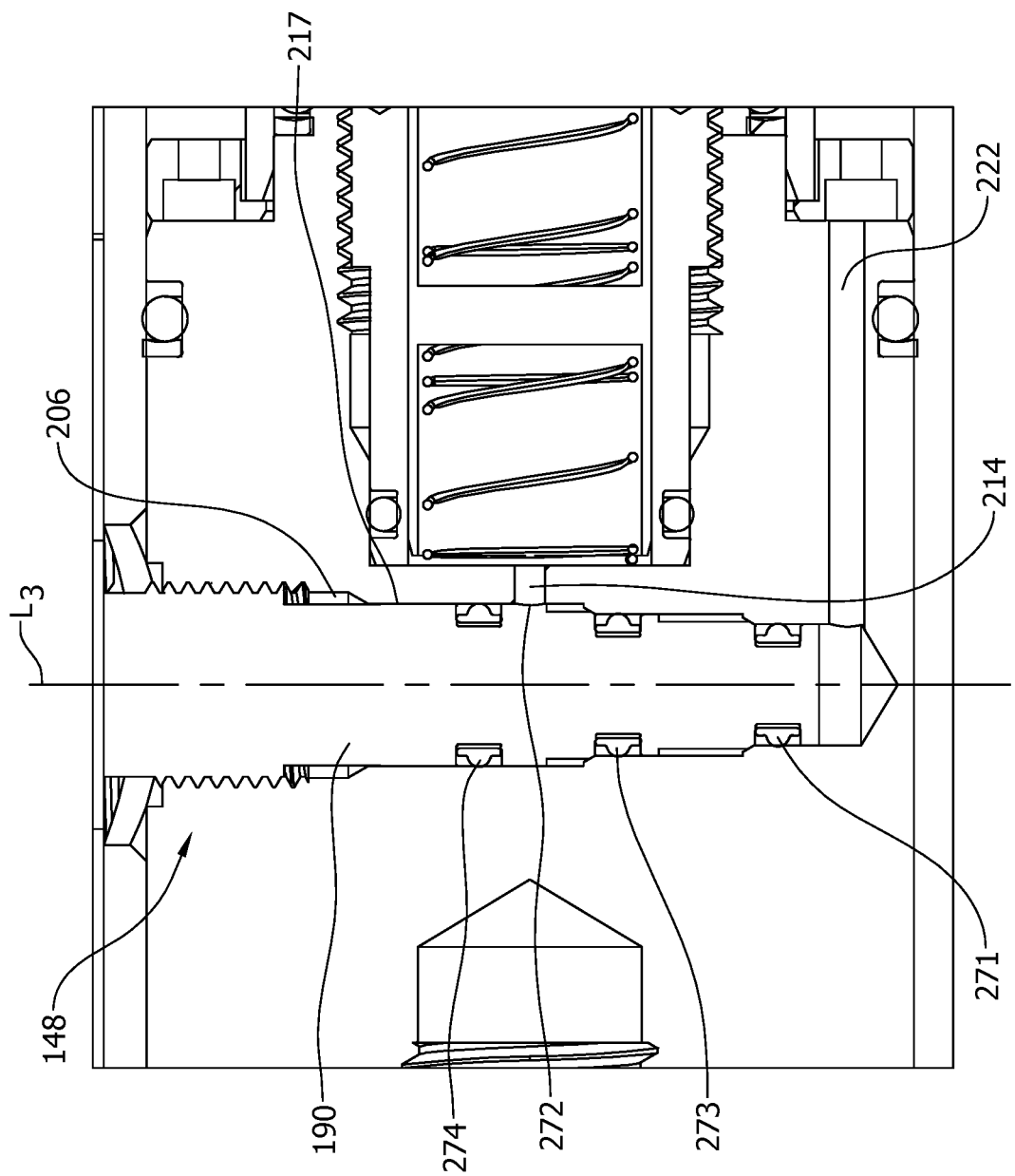
FIG. 16 is an enlarged view of the region B shown in FIG. 7, showing the active damper lock in a sealed position.

FIG. 16 is an enlarged sectional view of the active damper lock 148, showing the active damper lock 148 in the sealed state. The active damper lock 148 is moveable from the unsealed state to the sealed state by activating the drive 168 (shown in FIG. 6) coupled to the lock shaft 190, which drives the lock shaft 190 downward along the extension axis $L_3$ within the active lock chamber 206. In other embodiments, the active damper lock 148 may be transitioned between the sealed state and the unsealed state by any actuation means that enables the active damper lock 148 to function as described herein.

In the sealed state, the lock shaft 190 is positioned such that the abutment 272 is longitudinally aligned with and covers the first passageway 214. Moreover, each of the first seal 271, the second seal 273, and the third seal 274 contact and seal against the chamber wall 217 when the active damper lock 148 is in the sealed state. In the embodiment of FIG. 16, the seals are resilient D-ring seals. In other embodiments, any seal that enables the active damper lock 148 to function as described herein may be used. When the active damper lock 148 is in the sealed state, fluid flow between the binary damper valve assembly 146 and the outer fluid channel 170 (FIG. 7) is inhibited by the abutment 272 and the seals. Additionally, the lock shaft 190 also prevents fluid flow between the accumulator 140 (FIG. 8) and both the outer fluid channel 170 and the binary damper valve assembly 146. Accordingly, as described above, the resistance of the damper assembly 126 is increased when the active damper lock 148 is in the sealed state.

Figure 17:
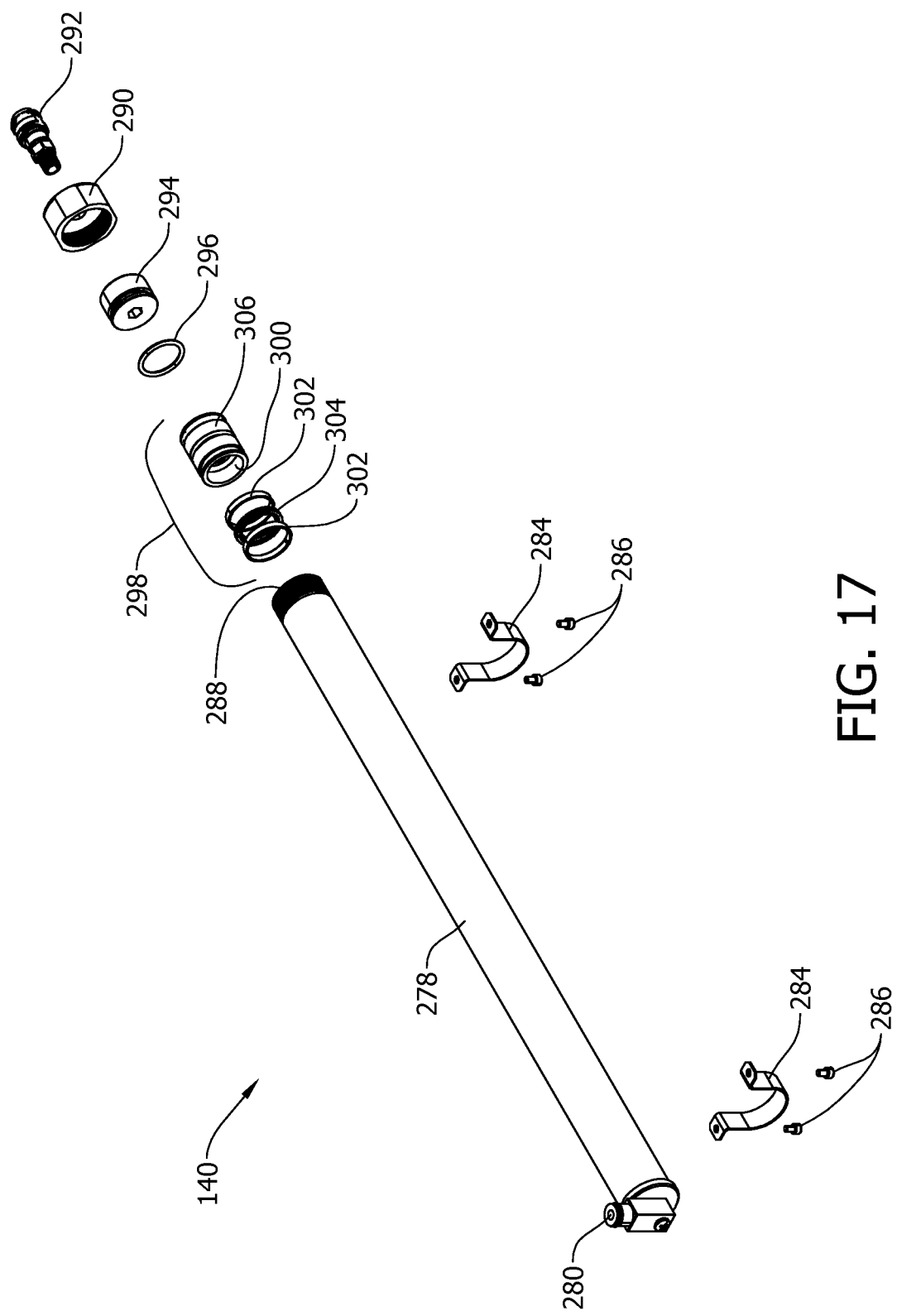
FIG. 17 is an exploded view of an accumulator shown in the damper assembly of FIG. 8.
Figure 18:
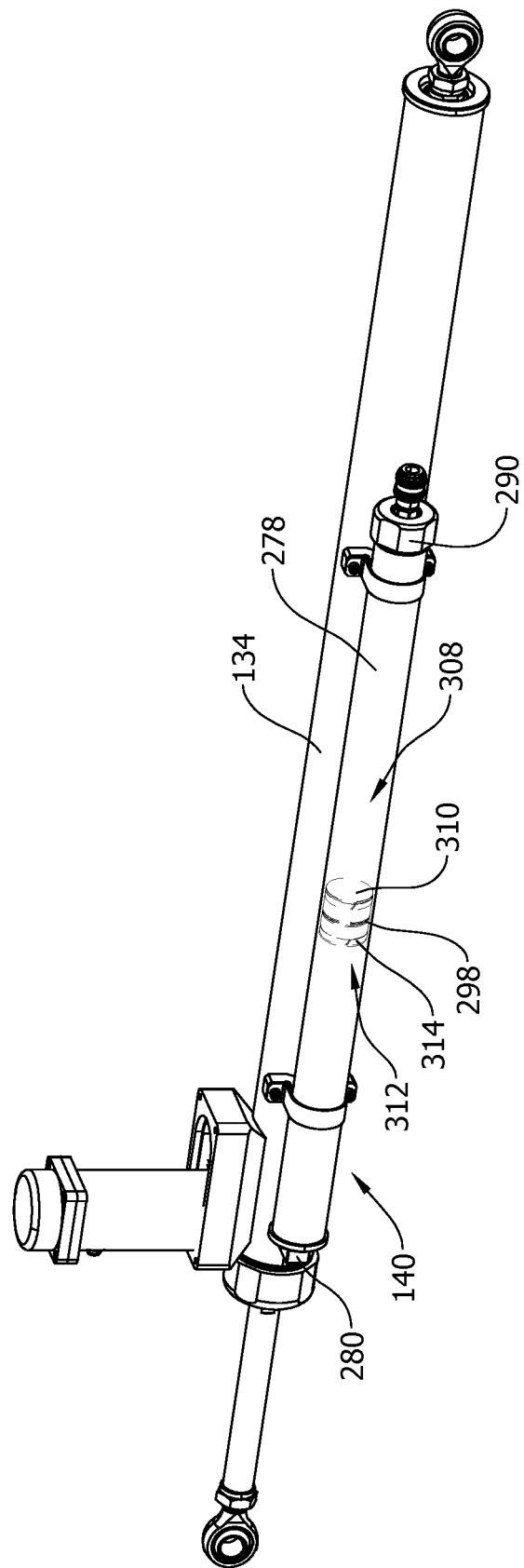
FIG. 18 is a perspective view of the damper assembly shown in FIG. 5.

FIG. 17 is an exploded view of the accumulator 140. FIG. 18 is a perspective view of the damper assembly 126 with a portion of the accumulator assembly 140 shown transparent to reveal internal construction. The accumulator 140 includes an accumulator tube 278 having a connecting port 280 thereon. The connecting port 280 provides fluid communication between an interior of the accumulator tube 278 and the primary fluid circuit 152 (FIG. 6). A pair of mounting straps 284 and fasteners 286 are included to couple the accumulator 140 to the outer tube 134 of the damper assembly 126. The accumulator tube 278 extends from the connecting port 280 to an open end 288. The accumulator 140 further includes an end cap 290 and a plug 292 that fits over the open end 288 and closes the accumulator tube 278 to the outside environment. An end seal 294 and O-ring 296 are included to seal the end cap 290 on the opening. The accumulator 140 further includes an accumulator piston assembly 298 sized to be received within the accumulator tube 278. The accumulator piston assembly 298 includes a piston 300 having a pair of piston 302 bearings and a piston seal 304 that are attachable to the outer surface 306 of the piston 300.

As described above with respect to FIG. 6, during operation, the accumulator 140 contains excess fluid from the primary fluid circuit 152 that is displaced by the volume of the piston 136. Referring to FIG. 18, the connecting port 280 is coupled in fluid communication with the primary fluid circuit 152 (when the active damper lock 148 is in the unsealed state) such that fluid may flow between the primary fluid circuit 152 and the accumulator tube 278. The piston assembly 298 is received within the accumulator tube 278. The piston seal 304 engages the accumulator tube 278 to prevent fluid communication between a first portion 308 of the accumulator tube 278 on a first side 310 of the piston assembly 298 and a second portion 312 of the accumulator tube 278 on a second side 312 of the piston assembly 298. During use, the fluid from the primary fluid circuit 152 fills the second portion 312 of the accumulator tube 278.

As shown in FIG. 18, the piston 136 of the damper assembly 126 is fully retracted and the accumulator piston assembly 298 is positioned adjacent the end cap 290. The piston assembly 298 is moveable within the accumulator tube 278 in response to fluid entering and exiting the accumulator tube 278. For example, as the piston 136 of the damper assembly 126 is extended out of the inner tube 144 (FIG. 8) fluid within the accumulator tube 278 is drawn into the primary fluid circuit 152 to fill the volume left by the portion of the piston 136 that is extended from the inner tube 144 and the accumulator piston assembly 298 is moved toward the connecting port 280. When the piston 136 of the damper assembly 126 is fully extended out of the inner tube 144, the accumulator piston assembly 298 is positioned adjacent the connecting port 280.

The accumulator 140 also includes an additional fluid (not shown) on the first side 308 of the piston assembly 298 that moves the piston assembly 298 within the accumulator tube 278 in response to fluid leaving the accumulator tube 278. In particular, in the example embodiment, a gas is included within the accumulator tube 278 on the first side 308 of the accumulator piston assembly 298 to prevent loose movement of the piston assembly 298 within the accumulator tube 278. In the example embodiment, the gas is an inert gas, specifically nitrogen, though any suitable gas may be used in other embodiments.

Figure 23:
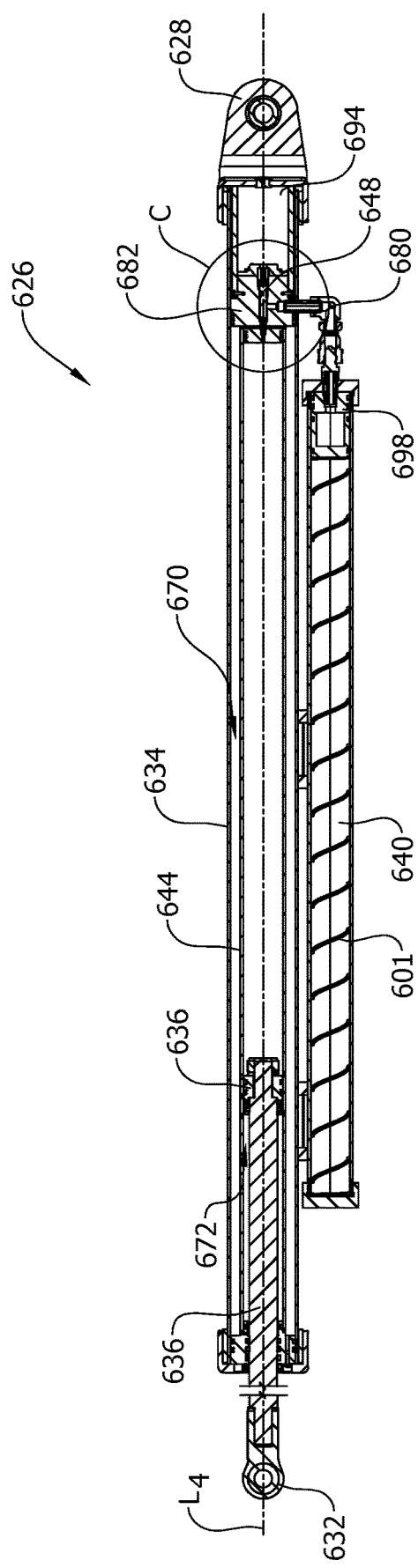
FIG. 23 is a cross-sectional view of the damper assembly of FIG. 22.

During assembly, the piston 136 of the damper assembly 126 is first extended to approximately a midway extension position and the accumulator piston assembly 298 is positioned approximately midway between the connecting port 280 and the end cap 290. The end cap 290 is removed and the nitrogen is introduced into the first portion of the accumulator tube 278 on the first side of the piston 136. The end cap 290 is then closed, sealing the nitrogen within the accumulator tube 278. As the piston 136 of the damper assembly 126 is retracted into the inner tube 144, the piston assembly 298 of the accumulator 140 is moved toward the end cap 290 by the added fluid from the primary fluid circuit 152 entering the accumulator 140 and the nitrogen is pressurized in the first portion of the accumulator tube 278. As the piston 136 of the damper assembly 126 is extended from the inner tube 144 and fluid is drawn back from the accumulator tube 278 and into the primary fluid circuit 152, the pressurized nitrogen on the first side of the accumulator piston assembly 298 moves the accumulator piston assembly 298 within the accumulator tube 278 to fill the space resulting from the reduced fluid volume. In other embodiments, the nitrogen gas may be added to the accumulator tube 278 with the piston 136 of the damper assembly 126 in any position. For example, in one embodiment the nitrogen gas is provided in the accumulator tube 278 with the piston 136 of the damper assembly 126 extended to a distance that it would be in with the panels in the stow position. In another embodiment, the nitrogen gas is provided in the tube with the piston 136 of the damper assembly 126 fully extended. In further embodiments, a biasing element (e.g., a compression spring as shown in the embodiment of FIG. 23), is included within the accumulator tube 278 to bias the piston 136 towards the connecting port 280.

Figure 19:
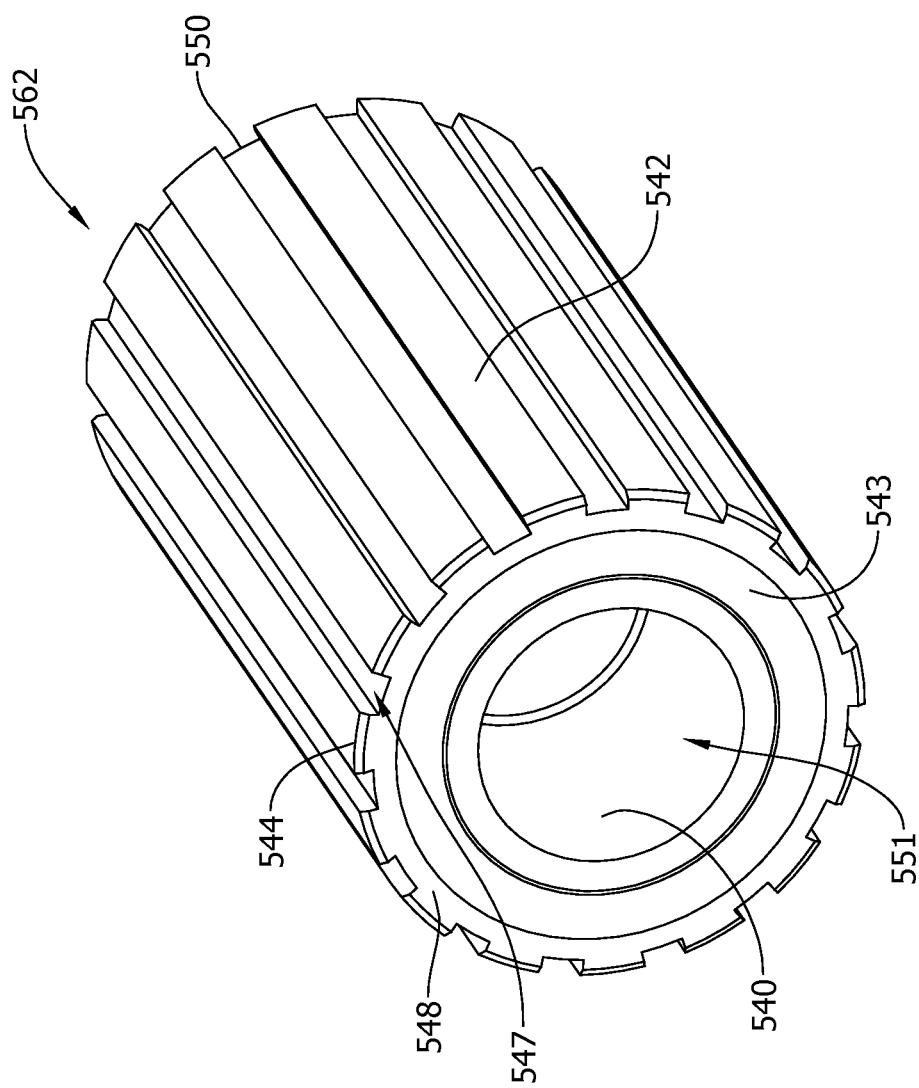
FIG. 19 is a perspective view of another embodiment of a binary valve for use with the damper assembly of FIG. 5.
Figure 20:
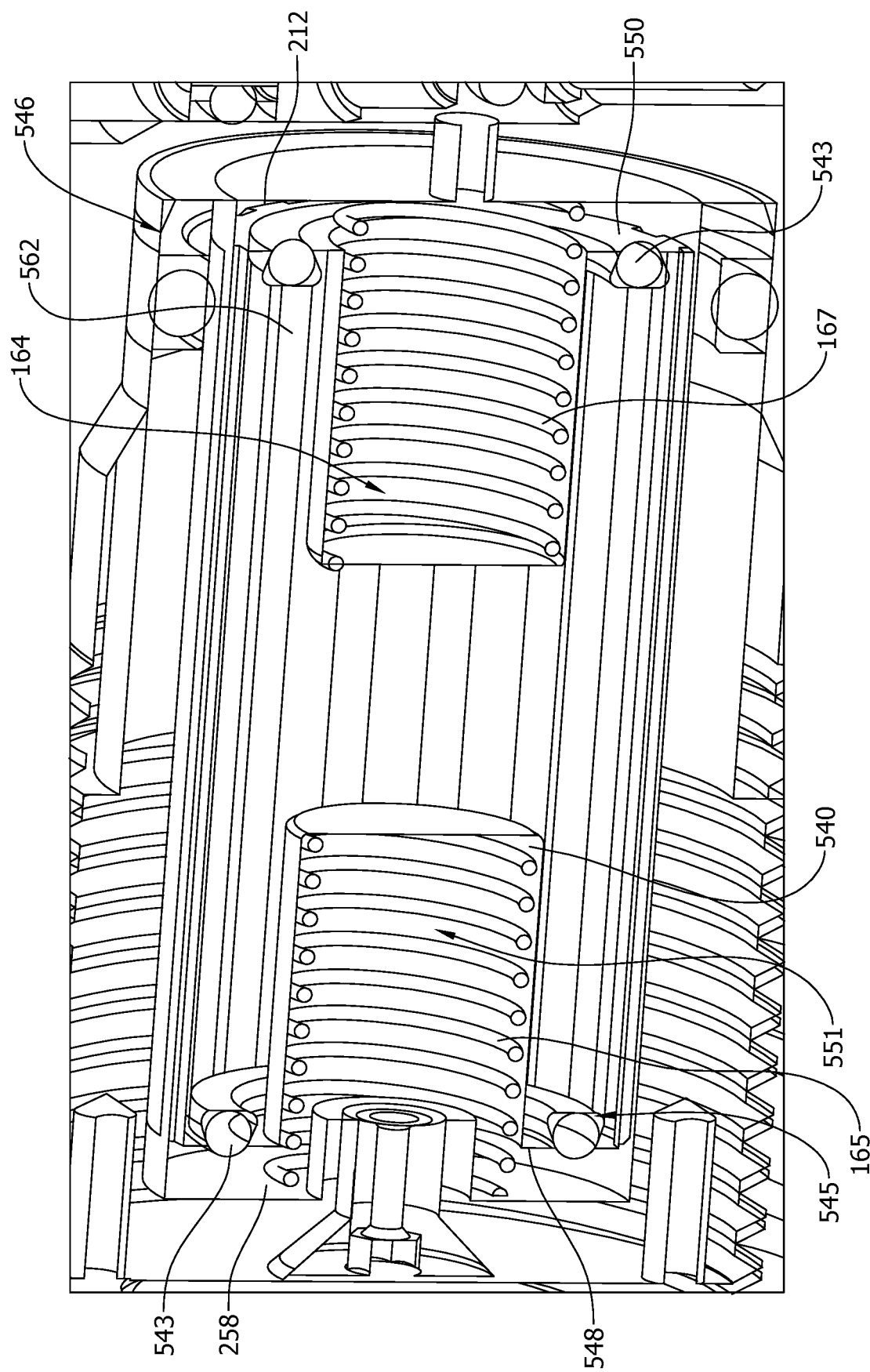
FIG. 20 is a cross sectional view of another embodiment of a binary damper valve assembly for use with the damper assembly of FIG. 5, including the binary valve of FIG. 19 in a low resistance state.
Figure 21:
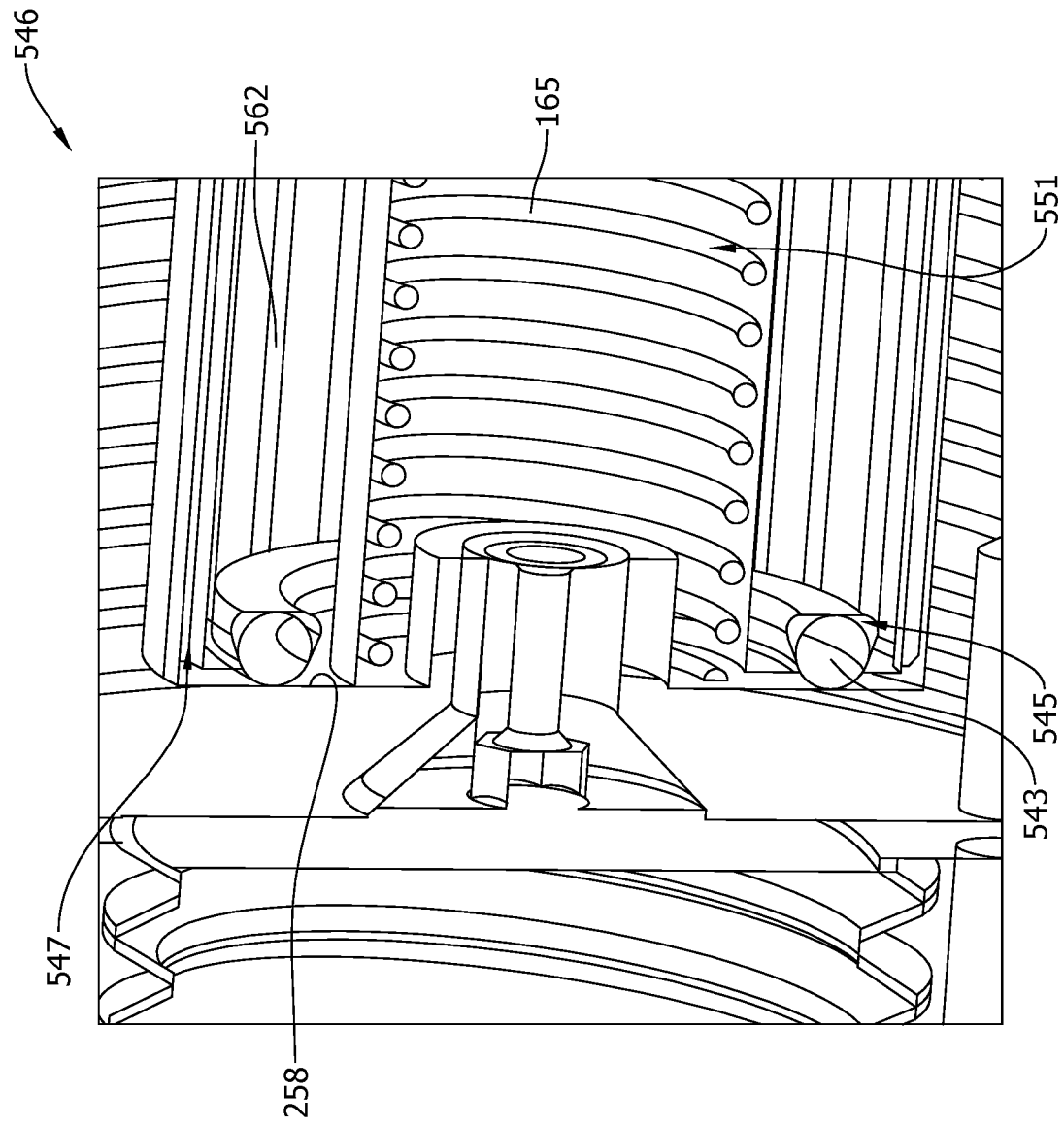
FIG. 21 is a cross sectional view of the binary damper valve assembly of FIG. 20 with the binary valve in a high resistance state.

FIG. 19 shows a perspective view of an alternative binary valve 562 for use with the damper assembly 126 shown in FIGS. 5-18. FIG. 20 is a cross sectional view of an alternative binary damper valve assembly 546 including the binary valve 562 of FIG. 19 in a low resistance state. FIG. 21 is a cross sectional view of the alternative binary damper valve assembly 546 of FIG. 20 with the binary valve 562 in a high resistance state. The alternative binary valve 562 is substantially the same as the binary valve 162 described above with respect to FIGS. 5-18, except as described below.

The binary valve 562 of FIG. 19 is generally annular and extends axially between a first axial end 548 and a second axial end 550. The binary valve 562 assembly includes the biasing assembly 164, including the first and second biasing elements 165, 167 (shown in FIG. 20) which bias the binary valve 562 to a low resistance state, similar to the low resistance state described above with respect to the binary valve 162 of FIG. 12. However, unlike the binary valve 162 of FIG. 12, which restricts fluid flow therethrough when in a high resistance state, the binary valve 562 of FIG. 19 blocks fluid flow through the binary valve 562 when in a high resistance or sealed state. In particular, unlike the binary valve 162 of FIG. 12, the binary valve 562 of FIG. 19 does not include radially extending slots 252 defined in the first and second axial ends 548, 550. Instead, the binary valve 562 includes resilient seals 543 that are received in grooves 545 (FIG. 20) defined in each of the axial ends 548, 550. In particular, referring to FIG. 20, each of the first and second axial ends 548, 550 defines a dove-tail shaped groove 545 radially outward from the inner surface 540 and extending circumferentially about the respective axial ends 548, 550 to circumscribe the inner cavities 551. The seals 543 are sized to extend axially out of the grooves 545 and beyond the axial ends 548, 550 of the binary valve 162. In the embodiment of FIG. 19, the seals 543 are O-ring seals, though different seals may be used in other embodiments.

As shown in FIG. 20, when the binary valve 562 is in the low resistance state, fluid flow through the binary valve 562 is similar to fluid flow to the binary valve 162 of FIG. 12, in that it may flow around the axial ends to the channels 547 (FIG. 19) defined in the outer surface 542. Referring to FIG. 21 when transitioned to the high resistance state, (e.g., in response to a high wind event), the seal 543 of the binary valve 562 engages either the respective tunnel face 258 (e.g., in response to extension of the piston 136) or the rear face 212 (e.g., in response to retraction of the piston 136), and the binary valve 562 seals off fluid flow between the channels 547 and the inner cavities 551 of the binary valve 562.

When the binary damper valve assembly 546 is in the high resistance state, the damper assembly 126 may provide a resistance force of between approximately 5 and 35 kilonewtons, between 10 and 30 kilonewtons, or between 15 and 25 kilonewtons. More specifically, in the embodiment of FIG. 21, when the binary damper valve assembly 546 is in the high resistance state, the damper assembly 126 provides a resistance force of approximately 20 kilonewtons. In other embodiments, the damper assembly 126 provides any resistance force when the binary damper valve assembly 546 is in the high resistance state or in the low resistance state that enables the damper assembly 126 to function as described herein. For example, and without limitation, in one alternative embodiment, when the binary damper valve assembly 546 is in the high resistance state, the damper assembly 126 provides a resistance force that is similar to the force provided when the active damper lock 148 (FIG. 16) is in the sealed state (e.g., about 50 kilonewtons).

As the piston 136 velocity decreases, the biasing elements 165, 167 transition the binary valve 562 to the low resistance state in a similar manner as the binary damper valve assembly 146 of FIGS. 12-15. Although the binary valve 562 of FIGS. 19-21 is described herein for use with the damper assembly 126 of FIGS. 5-18, it should be understood that the binary valve 562 may be used with any suitable damper assembly 126. For example, some alternative damper assemblies contemplated by this disclosure include the binary damper valve assembly 146 of FIGS. 19-21 and do not include an active damper lock 148, as described above with respect to FIGS. 5-18.

Figure 22:
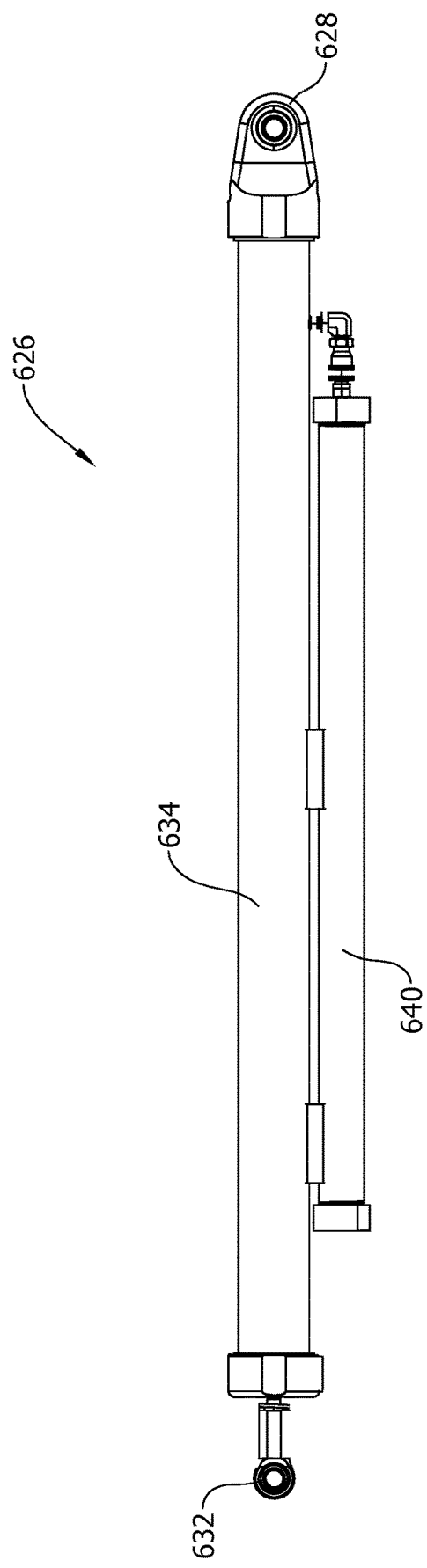
FIG. 22 is a side view of another embodiment of a damper assembly for use with the solar array row of FIG. 1.

FIG. 22 is an alternative embodiment of a damper assembly 626 for use with the solar array row 102 shown in FIGS. 1-4. FIG. 23 is a cross-sectional view of the damper assembly 626 of FIG. 22. The alternative damper assembly 626 is substantially the same as the damper assembly 126 described above with respect to FIGS. 5-18, except as described below.

The damper assembly 626 extends between a first end 628 that is pivotably attachable to the linkage member 130 (FIG. 3) and a second end 632 that is pivotably attachable to the support column 116. The damper assembly 626 includes an outer tube 634 and an accumulator assembly 640 attached to the outer tube 634. Referring to FIG. 23, the damper assembly 626 directs fluid between an inner fluid channel 672 and an outer fluid channel 670 in substantially the same manner as described with respect to the embodiment of FIGS. 5-18. The damper assembly 626 further includes an active damper lock 648 that is selectively controllable to inhibit fluid communication therethrough in substantially the same manner as described above with respect to the damper assembly 126 shown in FIGS. 5-18. However, in the embodiment of FIG. 23, the active damper lock 648 is arranged to extend in a direction parallel to the longitudinal axis $L_4$ of the damper assembly 626. Additionally, the controller assembly 694 is included within the outer tube 634 of the damper assembly 626 and is positioned longitudinally between the lock housing 682 and the first end 628. Moreover, in the embodiment of FIG. 23, the damper assembly 626 does not include a binary damper valve assembly 146.

The accumulator 640 is coupled in flow communication with the fluid in the outer tube 634 and configured to function in substantially the same manner as described above with respect to the embodiment shown in FIGS. 5-18. However, in the embodiment of FIG. 23, the accumulator 640 further includes a biasing element 601 that biases an accumulator piston assembly 698 towards the connecting port 680 of the accumulator 640. Accordingly, when the piston 636 is extended, as shown in FIG. 23, the volume of fluid within the accumulator 640 is at a minimum and the biasing element moves the accumulator piston 698 adjacent the connecting port 680. As the piston 636 is retracted into the inner tube 644, the piston 636 in the inner tube 644 displaces a portion of the fluid within the inner tube 644 into the accumulator 640, which applies a force on the accumulator piston 698 that is greater than the force applied by the biasing element 601 to move the piston 698 away from the connecting port 680.

Figure 24:
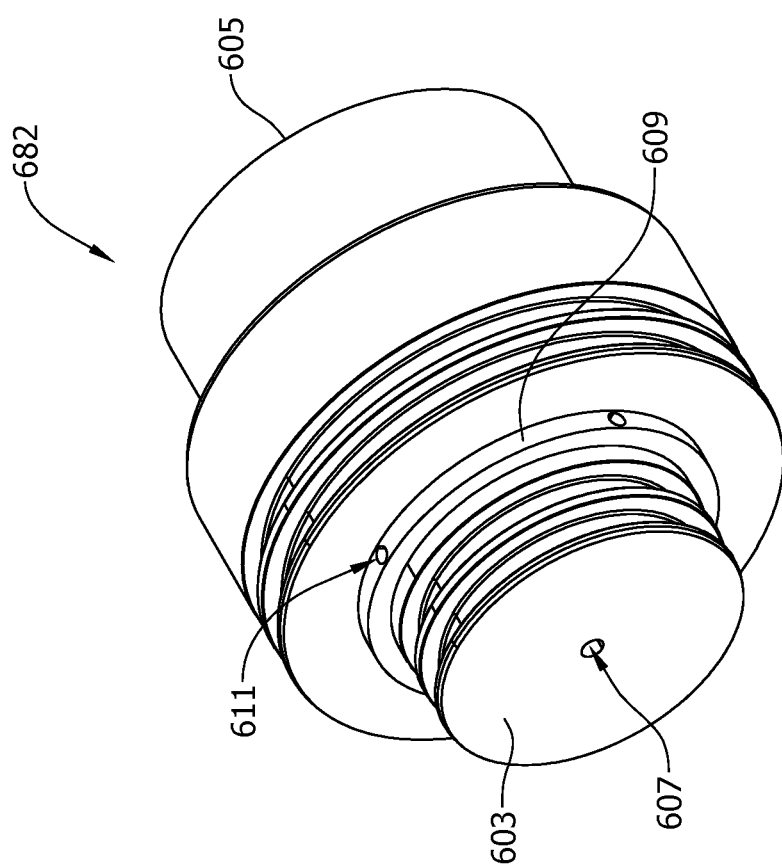
FIG. 24 is a perspective view of a lock housing shown in the damper assembly of FIG. 22.
Figure 25:
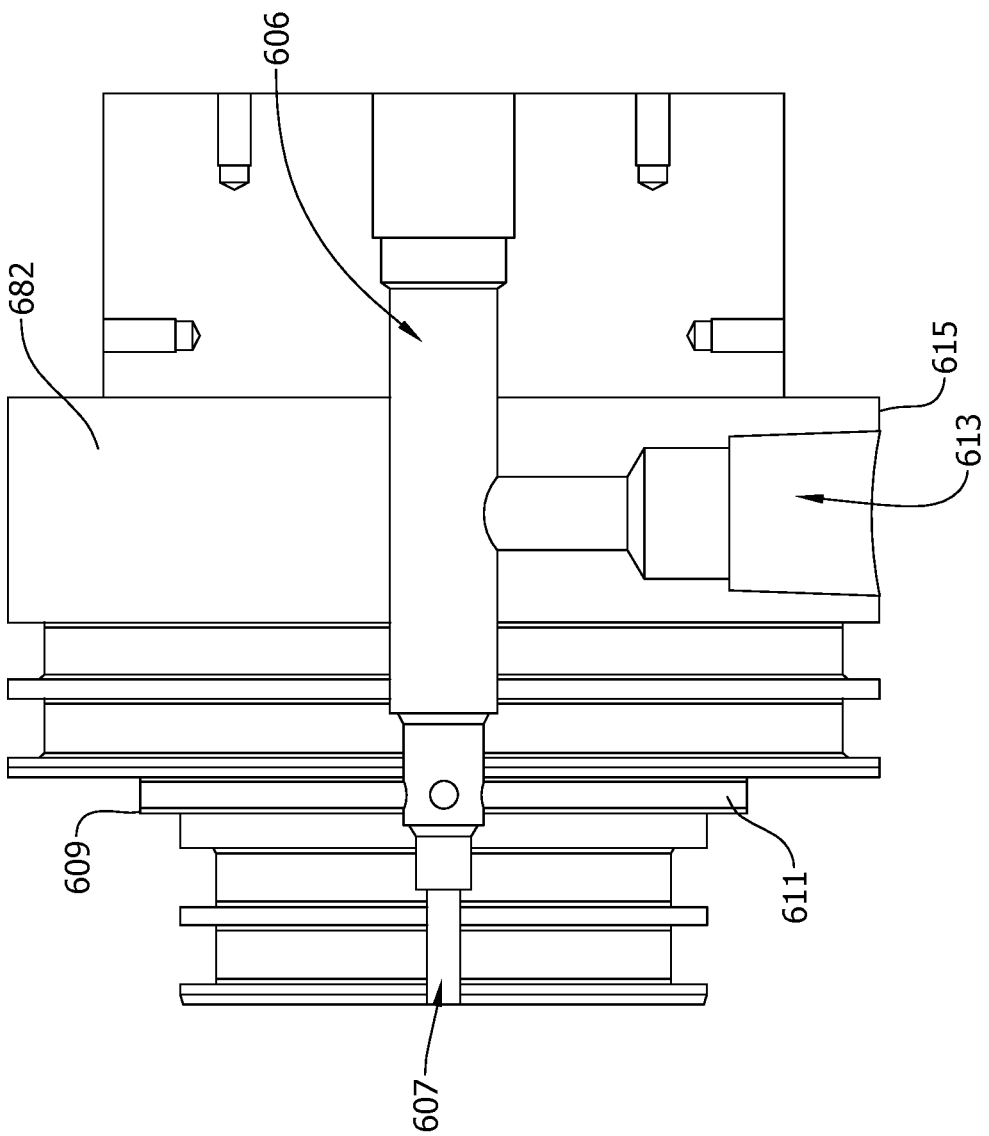
FIG. 25 is a cross sectional view of the lock housing shown in FIG. 24.

FIG. 24 shows a perspective view of the lock housing 682 used in the alternative damper assembly 626. FIG. 25 shows a cross sectional view of the lock housing 682. The lock housing 682 extends axially between a front face 603 and a rear side 605. The lock housing 682 defines an axial channel 607 in the front face 603. The lock housing 682 further includes a circumferential rim 609 positioned axially between the front face 603 and the rear side 605. A plurality of radial channels 611 are defined in the rim 609. The radial channels are circumferentially spaced about the rim 609. In particular, the rim 609 defines four radial channels 611 approximately 90 degrees apart from each other on the circumference of the rim 609. In other embodiments, the lock housing 682 defines any number of radial channels 611 that enable the lock housing 682 to function as described herein.

As shown in FIG. 25, the axial channel 607 extends into an active lock chamber 606 defined within the lock housing 682. The radial channels 611 each extend between the rim 609 and the active lock chamber 606. An accumulator channel 613 is defined within the lock housing 682 and extends between the active lock chamber 606 and an outer surface 615 of the lock housing 682.

Figure 26:
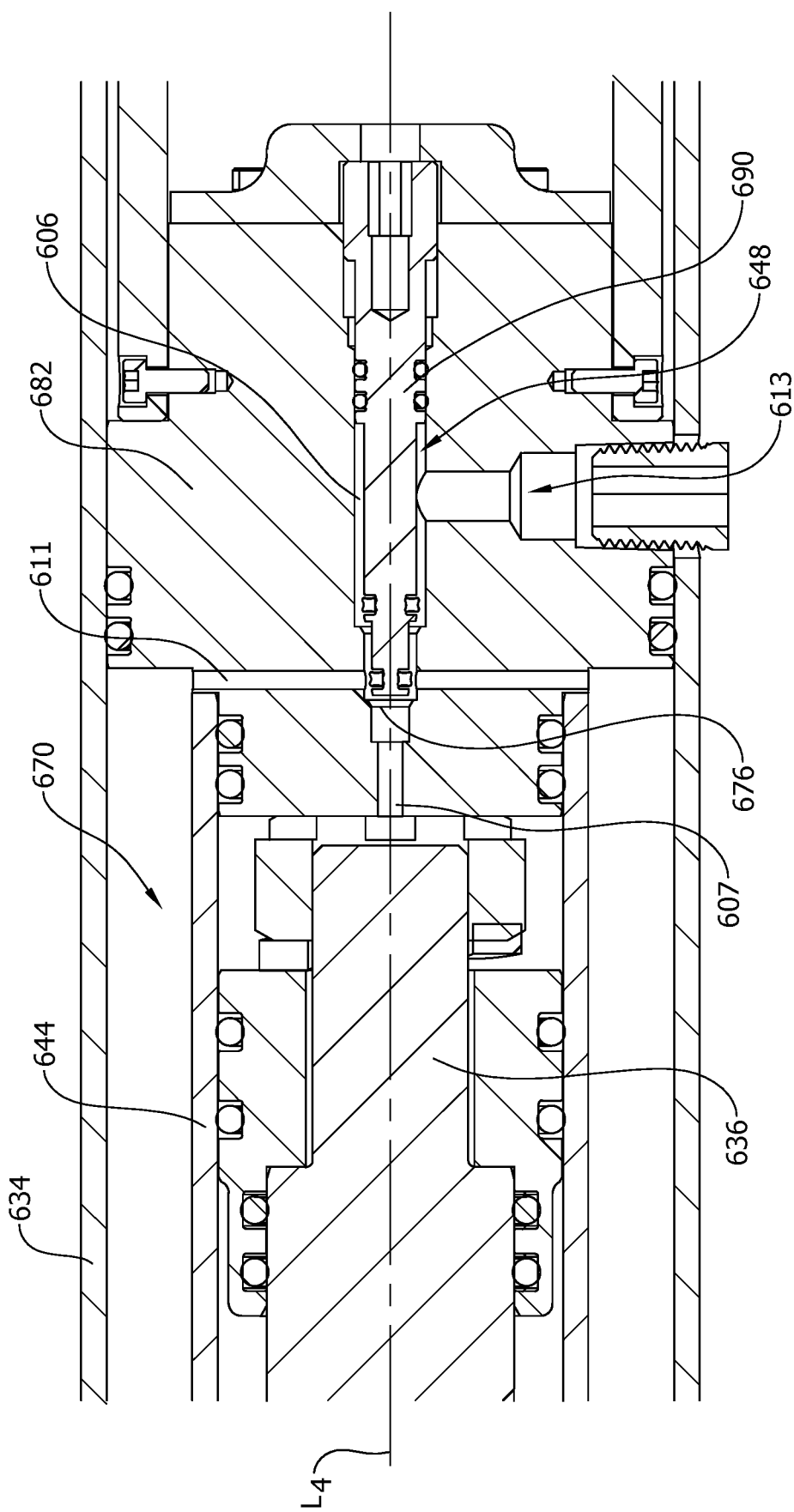
FIG. 26 is an enlarged view of the region C shown in FIG. 23, showing the active damper lock in an unsealed state.

FIG. 26 is a cross section of the region C, shown in FIG. 23, and shows the active damper lock 648 in the unsealed state and the piston 636 retracted in the inner tube 644. The active damper lock 648 is in the form of a spool valve and may be selectively extended and retracted in a similar manner as the active damper lock 648 described above with respect to FIGS. 5-18. However, in the embodiment of FIG. 26, the lock shaft 690 of the active damper lock 648 extends in a direction parallel to the longitudinal axis $L_4$ of damper assembly 626.

In the unsealed state, fluid is permitted to flow from the inner tube 644 into the axial channel 607 of the lock housing 682 and into one of the radial channels 611. The lock housing 682 is received within the outer tube 634 such that the radial channels 611 extend to the outer fluid channel 670 of the damper assembly 626. Fluid within the active lock chamber 606 may also flow around the shaft 690 to the accumulator channel 613.

Figure 27:
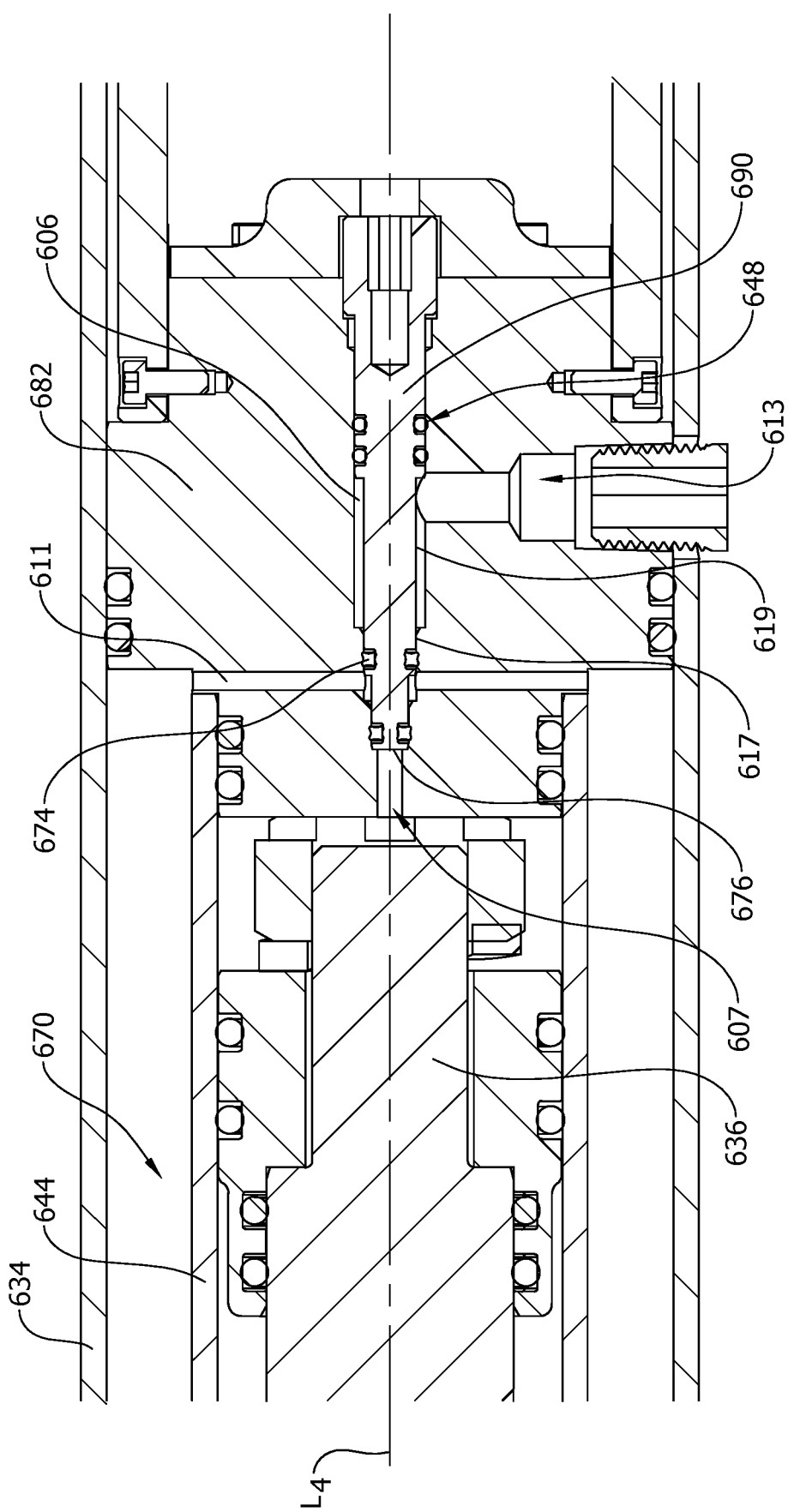
FIG. 27 is an enlarged view of the region C shown in FIG. 23, showing the active damper lock in a sealed state.

Referring to FIG. 27, in the sealed state, the lock shaft 690 is moved longitudinally within the active lock chamber 606 towards the piston 636. In particular, when the active damper lock 648 is in the sealed state, a distal end 676 of the lock shaft 690 contacts and covers the axial channel 607 to prevent fluid flow therethrough. The lock shaft 690 includes an enlarged circumferential portion 619 that abuts a sidewall 617 of the active lock chamber 606 in the sealed state. The sidewall 617 is positioned longitudinally between the radial channels 611 and the accumulator channel 613 to prevent fluid flow between the radial channels 611 and the accumulator channel 613. The lock shaft 690 further includes a plurality of seals 674 which seal against the active lock chamber 606 when the active damper lock 648 is in the sealed state. Accordingly, when the active damper lock 648 is in the sealed state, fluid flow between the axial channel 607, the radial channels 611, and the accumulator channel 613 is inhibited.

Figure 28:
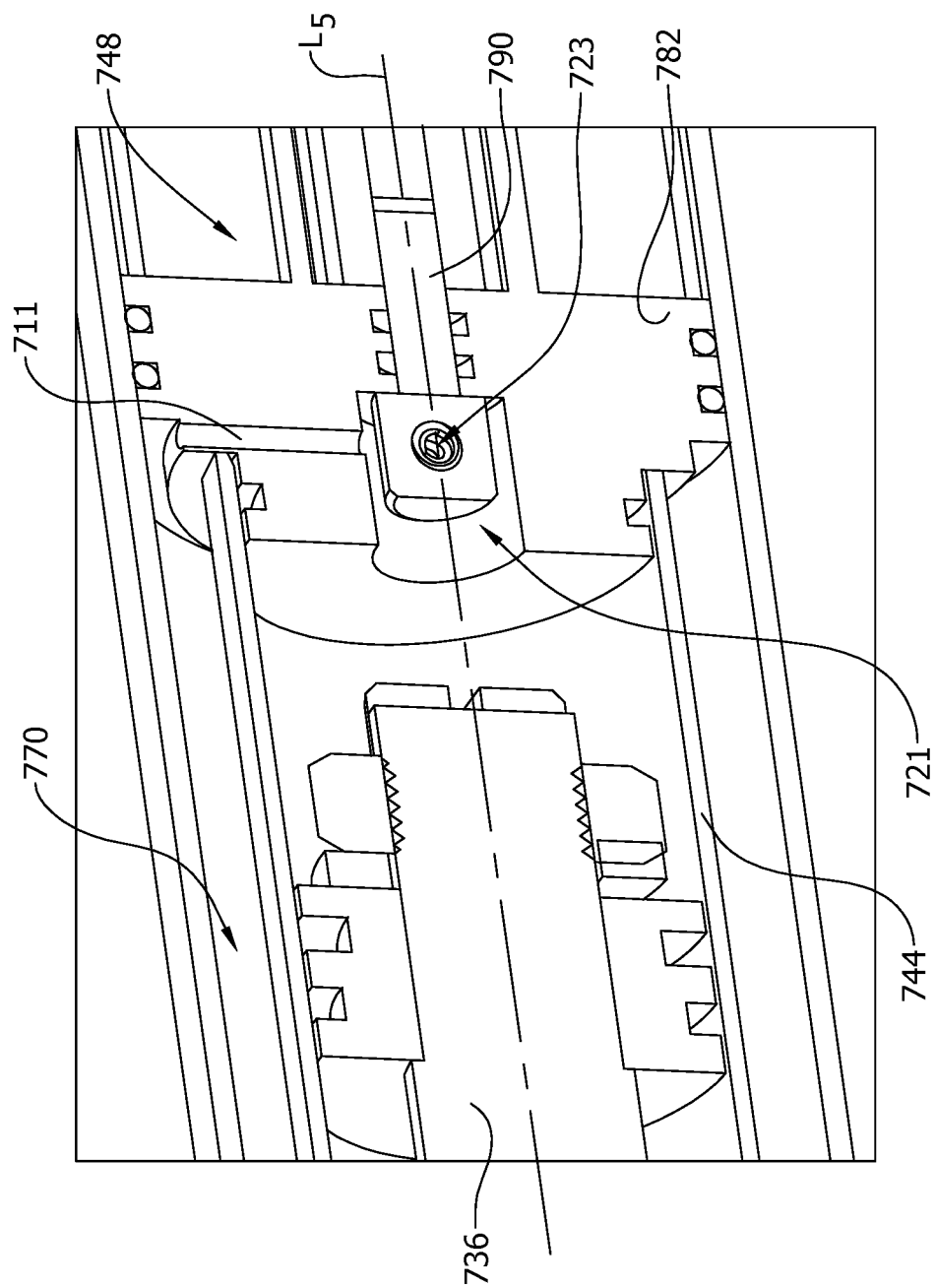
FIG. 28 is a cross sectional view of an alternate active damper lock for use with the damper assemblies of FIGS. 5 and 22, showing the active damper lock in an unsealed state.
Figure 29:
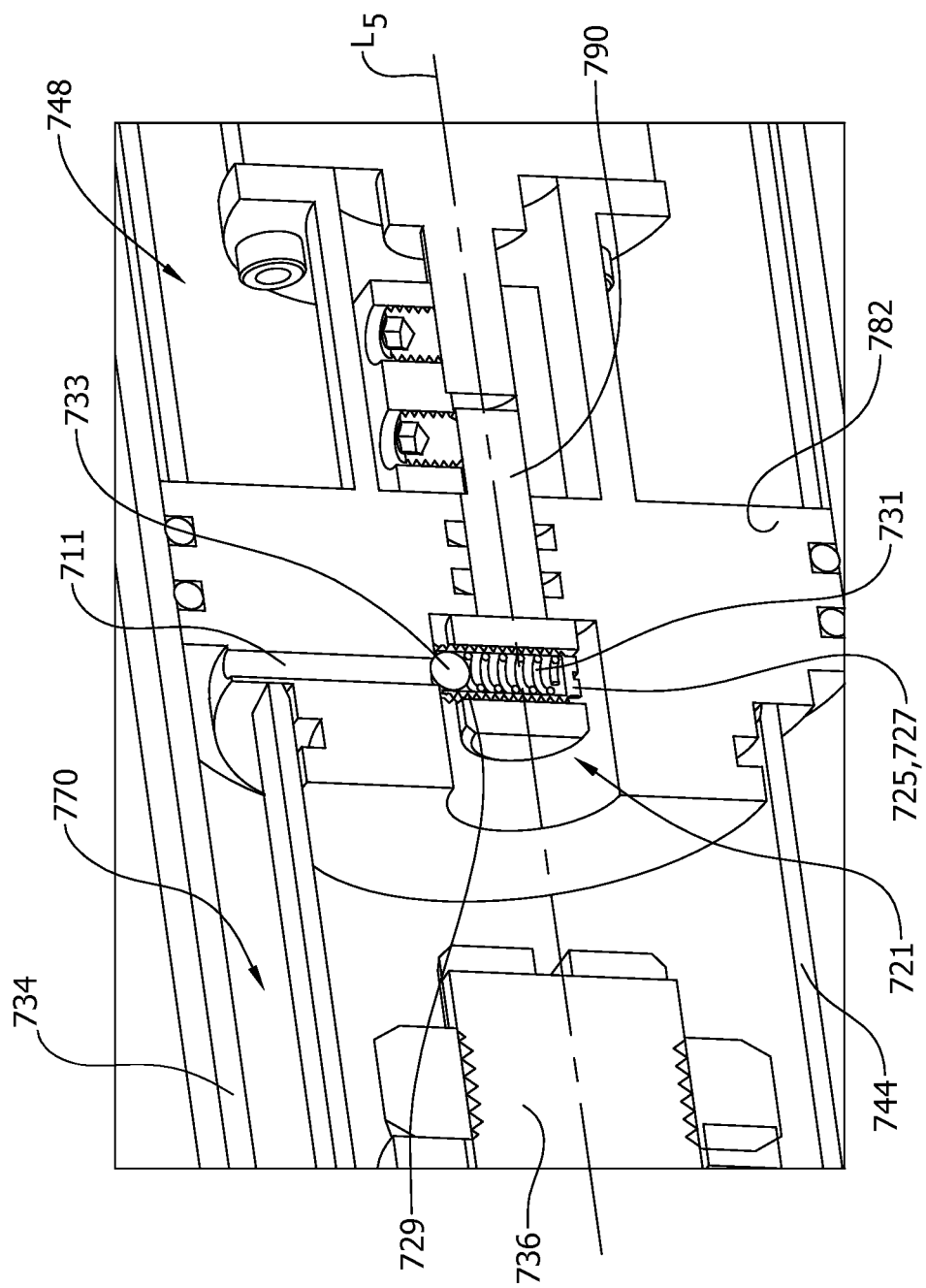
FIG. 29 is a cross sectional view of the active damper lock of FIG. 28, showing the active damper lock in a sealed state.

FIGS. 28 and 29 show a cross sectional view of an alternative active damper lock 748 for use with either of the above-described damper assemblies. FIG. 28 shows the active damper lock 748 in an unsealed state. FIG. 29 shows the active damper lock 748 in a sealed state.

Referring to FIG. 28, the active damper lock 748 includes a lock housing 782 positioned within the outer shell 734. The lock housing 782 defines a cavity 721 therein and a radially extending channel 711. The radially extending channel 711 provides fluid communication between the cavity 721 and the outer fluid channel 770 of the damper assembly. The cavity 721 is in fluid communication with the inner tube 744. The cavity 721 is sized to receive at least a portion of a shaft 790 therein. The shaft 790 defines a longitudinal axis $L_5$ extending colinearly with the inner tube 744. In the illustrated embodiment, the longitudinal axis $L_5$ of the shaft 790 is also parallel to a longitudinal axis $L_2$ of the damper assembly 126 (shown in FIG. 7). The shaft 790 is rotatable about the longitudinal axis $L_5$ (e.g., via a motor or other drive) to move the shaft 790 between the sealed state and the unsealed state.

The shaft 790 defines a central bore 723 that contains a valve assembly 725 (FIG. 29) therein. As the piston 736 is retracted into the inner tube 744, fluid between the piston 736 and the lock housing 782 is directed into the cavity 721 between the shaft 790 and the lock housing 782 and into the radial channel 711, also referred to herein as a "housing channel." From the radial channel 711 the fluid is directed into the outer fluid channel 770. In the unsealed state the valve assembly 725 does not block fluid communication between the radial channel 711 and the cavity 721.

Referring to FIG. 29, in the sealed state the shaft 790 is rotated approximately 90 degrees about the longitudinal axis $L_5$ from the unsealed state to block fluid communication between (i.e., fluidly isolate) the cavity 721 and the radial channel 711. In particular, the valve assembly 725 includes a sleeve 727 that is received within the central bore 723 of the shaft 790. The sleeve 727 includes threads 729 on an outer circumferential surface that are sized to engage corresponding threads of the central bore 723 (FIG. 28) of the sleeve 727. In alternative embodiments the sleeve 727 may be coupled to the shaft 790 in any manner that enables the valve assembly 725 to function is described herein.

The sleeve 727 includes a biasing element 731 received therein that engages a ball 733, also referred to herein as a "valve," and biases the ball 733 radially outward of the shaft 790. As the shaft 790 is rotated to the sealed state, the ball 733 is positioned in alignment with the radial channel 711 and the biasing element 731 biases the ball 733 radially outward to block and/or obstruct the radial channel 711 from fluid communication with the cavity 721. The biasing element 731 provides a sufficient biasing force on the ball 733 such that the ball 733 is not displaced by heavy tension loads on the damper assembly. In other embodiments, a different biasing element may be used such that a desired tension load on the damper assembly causes fluid pressure on the ball 733 to overcome the biasing force of the biasing element 731 and permit at least some fluid flow between the ball 733 and the radial channel 711. To transition the active damper lock 748 to the unsealed state, the shaft 790 is rotated 90 degrees in the opposite direction to move the ball 733 out of alignment with the radial channel 711 and permit fluid communication between the radial channel 711 and the cavity 721. In the illustrated embodiment, the valve assembly 725 is a ball check valve. In other embodiments the valve assembly 725 may include any valve assembly 725 that enables the active damper lock 748 to function as described herein.

Figure 30:
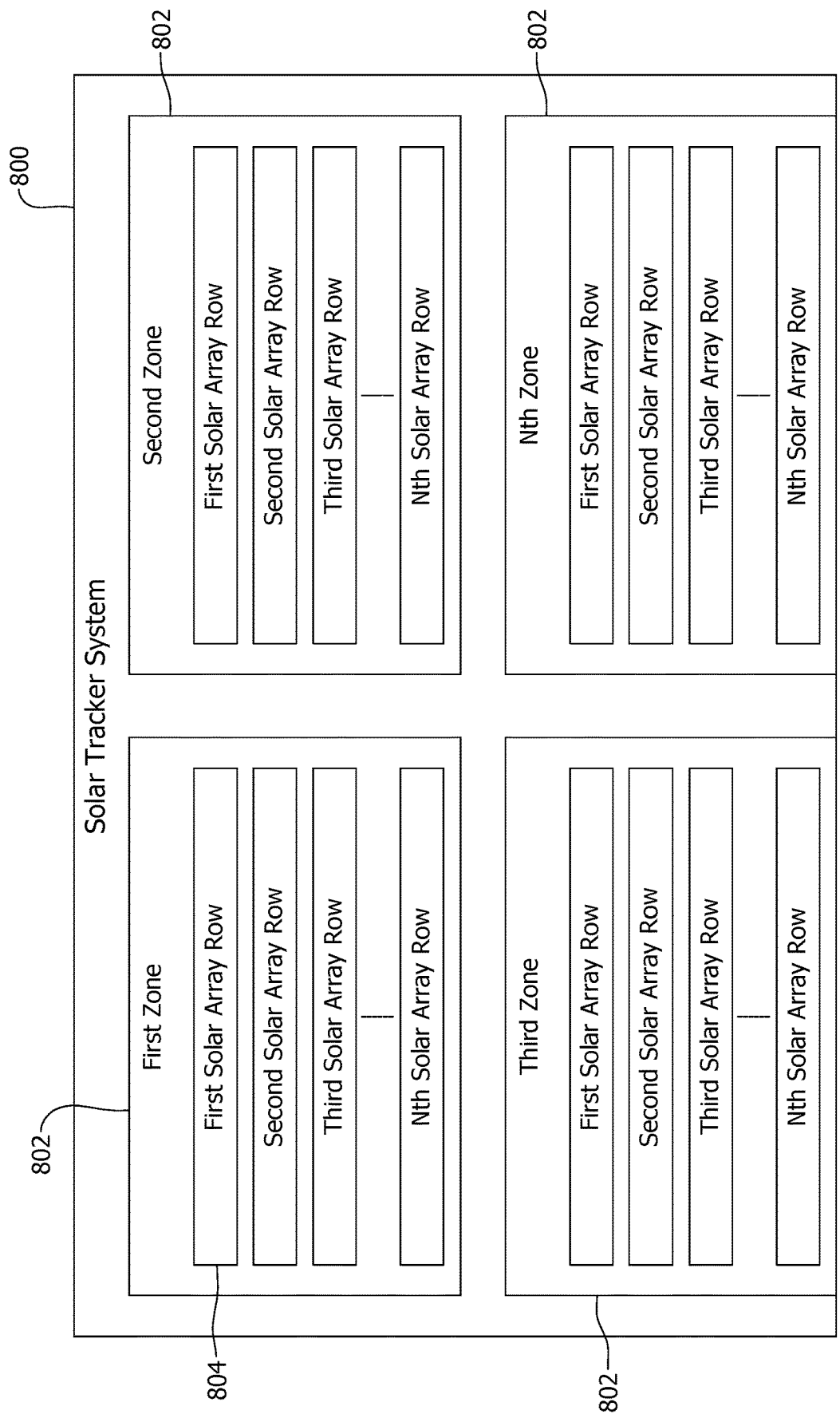
FIG. 30 is a schematic view of a solar tracker system.

FIG. 30 shows a schematic view of a solar tracker system 800. The solar tracker system 800 is divided into a plurality of zones 802 each including a plurality of solar array rows 804 therein. In the embodiment of FIG. 30, each zone 802 includes at least 100 solar array rows 804, though it should be understood that the zones 802 may include any number of rows 804 that enable the solar tracker system 800 to function as described herein. Each solar array row 804 is substantially similar to the solar array row 102 shown in FIG. 1. That is, each solar array row 804 is configured for tracking about at least one axis. The solar tracker system 800 may be located in a solar array location (e.g., a solar power field) and the zones 802 may be located adjacent to one another.

FIG. 31 shows a schematic view of a control system 806 for the first zone 802 of the solar tracker system 800 shown in FIG. 30. Though the control system 806 is described herein with respect to the first zone 802, it should be understood that each zone 802 of the solar tracker system 800 may include a control system 806 that is substantially similar to the control system 806 described herein with respect to the first zone 802.

The first zone 802 includes a first zone controller 808 communicatively coupled to a wind sensor 810. The wind sensor 810 may be coupled in either wireless or wired communication with the first zone controller 808. The wind sensor 810 is operable to detect a wind speed within the first zone 802 and transmit the wind speed to the first zone controller 808. The first zone controller 808 is coupled in communication with each solar array row 804 in the first zone 802 and is operable to control each solar array row 804 based on the wind speed detected by the wind sensor 810. In other embodiments, the first zone 802 includes a plurality of wind sensors 810 (not shown) positioned within the first zone 802. In some such embodiments, the first zone controller 808 approximates an average wind speed over the first zone 802 based on the separate measurements received from the plurality of wind sensors 810. In yet further embodiments, a plurality of the solar array rows 804 or each solar array row 804 may include a wind sensor 810 coupled in communication with the row controller 812. In some such embodiments, the row controllers 812 control row operations (e.g., tracking and adjustment of active damper locks) based on the measurements received from the wind sensor 810 associated with the row 804.

Each solar array row 804 includes a row controller 812 coupled in communication with the first zone controller 808. In the embodiment of FIG. 31, the row controller 812 is substantially the same as the row controller 812 assembly 122 shown in FIG. 2 and may be powered by controller power panels in substantially the same manner as described above. The row controllers 812 are each coupled in wired communication with the first zone controller 808. In other embodiments the row controllers 812 may be configured for wireless communication with the first zone controller 808.

The row controllers 812 are also communicatively coupled to a plurality of active lock device (ALD) drives 814 and a torque tube drive 816 associated with the row. In particular, the torque tube drive 816 is a slew drive substantially similar to the drive 120 shown in FIG. 2. Each row 804 includes a single row controller 812 and a plurality of ALD drives 814 coupled in communication with the row controller 812. In other embodiments, a single row controller 812 controls the ALD drives 814 and/or the torque tube drives 816 of adjacent rows 804. For example, in some such embodiments, a row controller 812 assembly may be included in one row for every three rows 804 of the zone 802. In such embodiments, the row controller 812 is communicatively coupled to, and operable to control, the ALD drives 814 and torque tube drives 816 of the row it is in and the immediately adjacent rows 804. In other embodiments, the first zone 802 may include any number of row controllers 812 that are operable to control any number of ALD drives 814 and/or torque tube drives 816.

As described in greater detail below, the row controllers 812 may be coupled in either wired or wireless communication with each of the ALD drives 814. Each row includes four ALD drives 814, each corresponding to a damper assembly on the row. In particular, in the embodiment of FIG. 31, each row includes four damper assemblies (similar to damper assembly 126 shown in FIG. 5) that each have a corresponding ALD drive 814. The damper assemblies may be positioned at various locations along a width of the row. For example, referring to FIG. 1, the row controller 812 is centrally located on the row (e.g., proximate the drive 120 as shown in FIG. 2). Each damper assembly and ALD drive 814 may be included on a separate support column of the row. The row controller 812 is centrally located with respect to the plurality of ALD drives 814 such that each ALD drive 814 is within a wireless range of the row controller 812. In other embodiments, each support column on the row includes a damper assembly and a corresponding ALD drive 814.

Referring back to FIG. 31, the ALD drives 814 each control active damper locks on the corresponding damper assemblies between the sealed and unsealed states in substantially the same manner as the above-described embodiments. The ALD drives 814 are located in a controller assembly that is similar to the controller assembly 194 shown in FIG. 8. In other embodiments, the ALD drives 814 are positioned on the damper assemblies in any manner that enables the ALD drives 814 to function as described herein.

The row controllers 812 are further communicatively coupled to an inclinometer 818. The inclinometer 818 is operable to detect an orientation of the panels and/or torque tube of the solar array row 804. The inclinometer 818 may include a gyroscope and/or accelerometer included within the row controller 812 assembly shown in FIG. 2. In the embodiment of FIG. 31, each of the inclinometers 818 are accelerometers operable to detect positions and orientations about six degrees of freedom, three of which are used to determine the orientation of the panels. The row controllers 812 are operable to determine, based on the detected orientation from the inclinometer 818, whether the inclinometer 818 has reached a target angle (e.g., when in the stowed position) and control the torque tube drive 816 based on the detected orientation.

During operation, the wind sensor 810 detects and transmits a detected wind speed to the first zone controller 808. During normal operation, the row controllers 812 may perform a tracking operation, wherein the active damper locks are unsealed and each of the row controllers 812 controls the orientation of the rows 804 panel assemblies and torque tube based on a position of the sun in the sky.

When the first zone controller 808 determines that a wind event is occurring, based on the detected wind speed exceeding a predetermined threshold, the first zone controller 808 transmits a signal to each row controller 812 instructing the row controllers 812 to perform a stow operation in which each of the rows 804 are moved to the stowed position (e.g., by controlling the drives shown in FIG. 1). The inclinometer 818 detects the orientation of the panel assemblies on the row and provides a signal to the row controller 812 indicating that the panel assemblies are in the stowed position. After the row controller 812 determines that the panel assemblies are in the stowed position, the row controller 812 controls the ALD drives 814 to seal the active locks.

With the active locks sealed, once the wind sensor 810 detects that the wind speed has fallen below a predetermined threshold, the first zone controller 808 may transmit a signal to each of the row controllers 812 instructing the row controller 812 to resume the tracking operation. In response, the row controllers 812 control the ALD drives 814 to unseal each of the active damper locks and each of the rows 804 are moved back into a tracking orientation that is based on a position of the sun. The row controllers 812 may also be locally controlled (e.g., via an operator at the row controller 812 assembly) to perform the stow operation or the tracking operation.

The solar tracker system 800 is further operable to control the row controllers 812 to perform additional stow operations, in which the panel assemblies may be moved into different orientations, based on factors in addition to or other than wind speed. For example, as described above, the solar tracker system 800 in a wind-stow operation moves the panel rows 804 the into a wind stow position, in which the panel assemblies are oriented parallel to the base surface 118 (shown in FIG. 4B) or generally perpendicular to the support column, in response to the wind sensor 810 detecting a wind event. The solar tracker system 800 is further operable to perform a snow-stow operation, a hail-stow operation, a flood-stow operation, and a night stow-operation. The snow-stow operation is performed in response to detecting a predetermined level of snow accumulation. The hail-stow operation is performed in response to detecting a predetermined level of hail. The flood-stow operation is performed in response to detecting a predetermined level of water accumulation. The night-stow operation is performed based on a predetermined time event (e.g., based on the setting of the sun).

In the snow-stow and hail-stow operations, the panel assemblies are moved to and locked in a relatively steep orientation. In particular, in one embodiment, the panels are oriented such that the angle $\theta_1$ (shown in FIGS. 4A and 4C) is between 50 degrees and zero degrees, between 30 degrees and zero degrees, and between 10 degrees and zero degrees, in at least one of the hail-stow and snow-stow operations. In the night-stow and flood-stow operations, the panel assemblies are oriented to, and locked in, approximately the same position as the wind-stow position. The first zone controller 808 is user programmable and the various stow operations and associated orientations of the panels may be preselected and defined by an operator. In further embodiments, the row controller 812 may be instructed to move to the stowed position based on a detected fault associated with the row.

Figure 32:
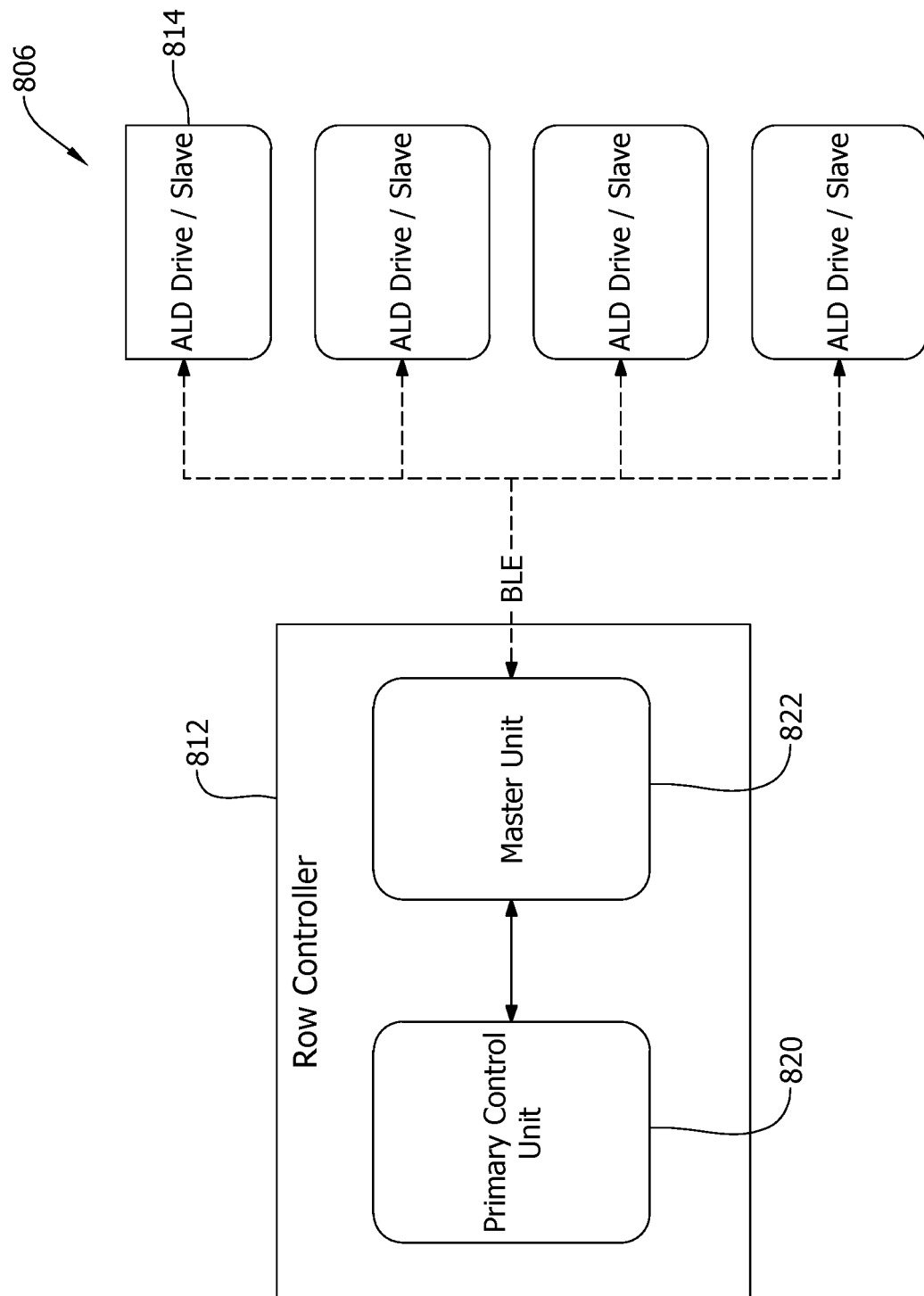
FIG. 32 is a schematic view of an example embodiment of a solar array row for use with the control system of FIG. 31.

FIG. 32 is an example embodiment of a control schematic of the first solar array row 804 shown in FIG. 31. The row controller 812 is coupled in wireless communication with each of the ALD drives 814. More specifically, each of the ALD drives 814 are connected via a Bluetooth Low Energy (BLE) signal. In other embodiments, the row controller 812 may be in any type of wireless data communication with the ALD drives 814 that enables the control system 806 to function as described herein.

Figure 33:
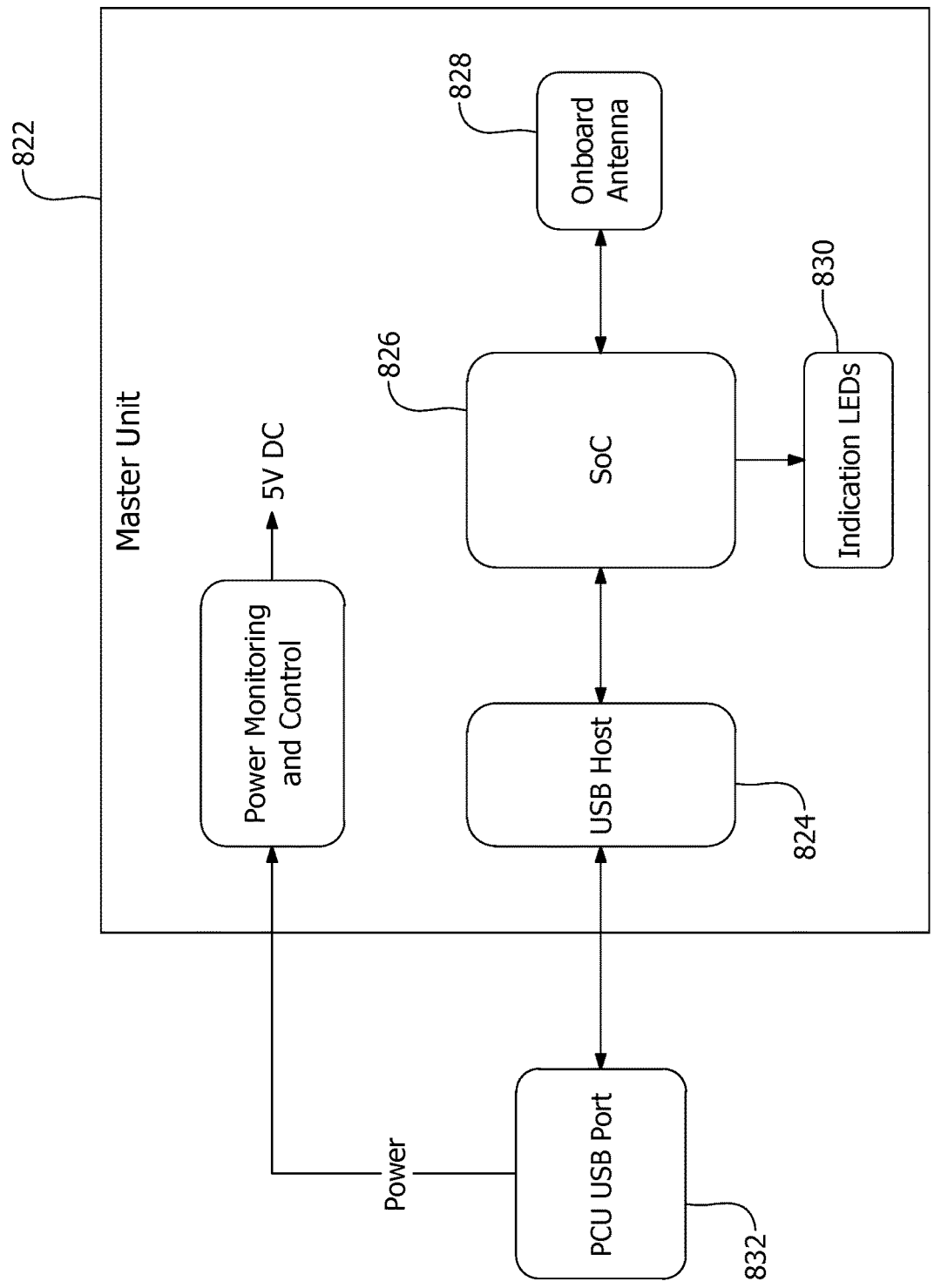
FIG. 33 is a schematic view of a master unit shown in the solar array row of FIG. 32.

The row controller 812 includes a primary control unit 820 and a master unit 822. The primary control unit 820 controls row orientation operations (e.g., controlling the torque tube drive 816) while the master unit 822 communicates with and controls the ALD drives 814. In other embodiments, the master unit 822 controls the drive and row orientation operations. The master unit 822 is connected to the primary control unit 820 via a USB connection (e.g., via a USB port coupled to the primary control unit 820). The master unit 822 includes a transceiver (e.g., an antenna 828 as shown in FIG. 33) to facilitate wireless communication with each of the ALD drives 814. The embodiment of FIG. 32 allows for modular retrofitting of existing control system 806s that may already have a primary control unit 820 configured to control row orientation operations. In other embodiments, the master unit 822 and the primary control unit 820 may be a single processing unit.

FIG. 33 is a schematic of the master unit 822 shown in FIG. 32. The master unit 822 includes a USB host 824, a system on a chip (SoC) 826, an onboard antenna 828, and indication LEDs 830. The onboard antenna 828 is a transceiver that transmits and receives a BLE signal to and from each of the ALD drives 814 (shown above). The master unit 822 receives power from the primary control unit (PCU) USB port 832. The USB host 824 is configured for two-way communication with the primary control unit 820 via the USB port 832. The SoC 826 includes a processor and a memory (not shown) that are communicatively coupled to the onboard antenna 828. The master unit 822 further includes a plurality of indication light emitting diodes (LEDs) 830. The indication LEDs 830 indicate at least one of a power status, fault status, and/or a communication status of the master unit 822.

Figure 34:
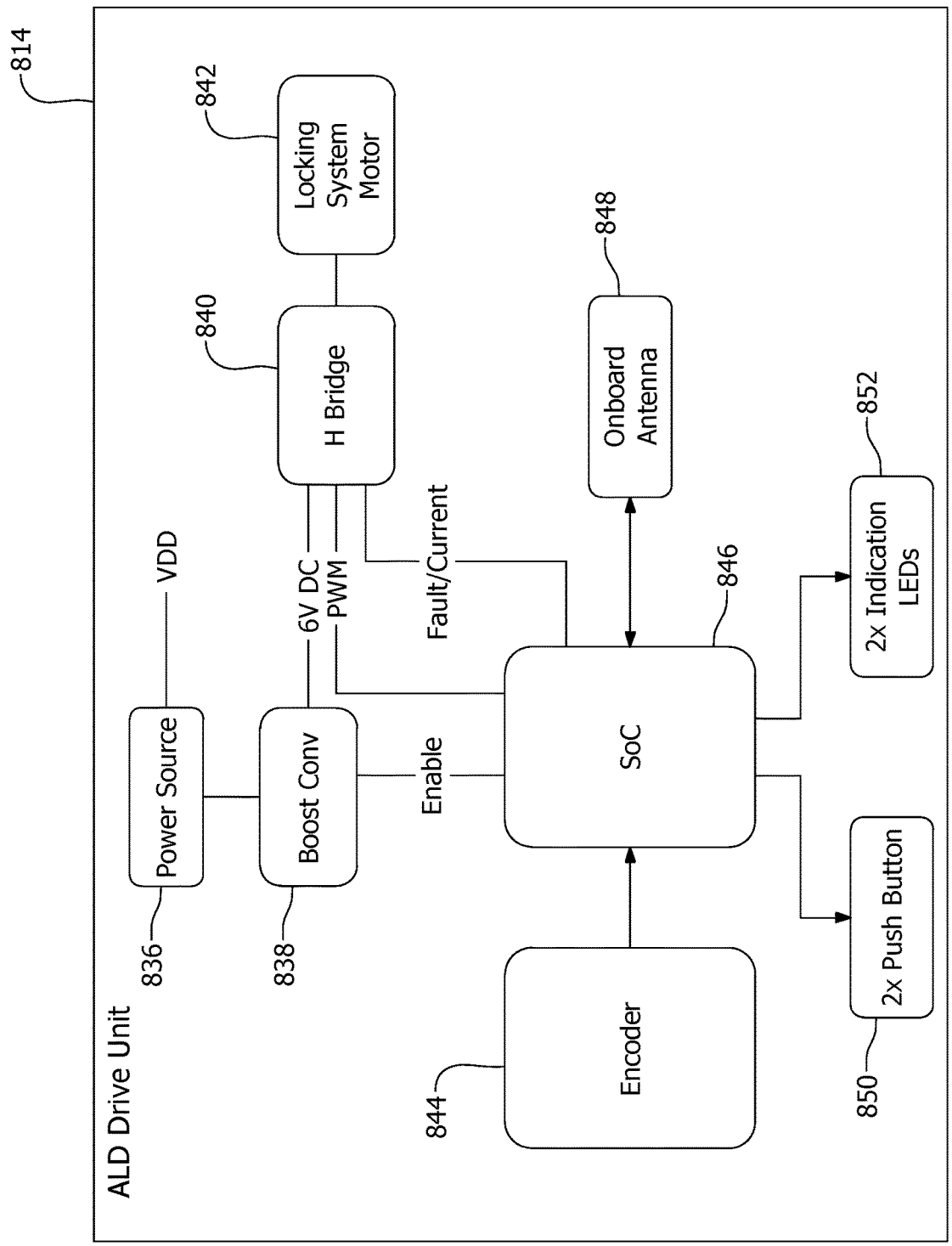
FIG. 34 is a schematic view of an active lock device drive unit shown in the solar array row of FIG. 32.

FIG. 34 is a schematic of the ALD drive unit 814 shown in FIG. 32. The ALD drive unit 814 includes a power source 836, a boost converter 838, an H-Bridge 840, a locking system motor 842, an encoder 844, a system on a chip (SoC) 846, an onboard antenna 848, two push buttons 850, and two indication LEDS 852. The ALD drive unit 814 is a wireless drive unit. That is, the ALD drive unit 814 is configured for wireless communication with the row controller 812 and has an internal power source 836. In other embodiments, as described below, the ALD drive unit 814 is configured for wired communication with the row controller 812 and may receive power via electrical connection with the row controller 812 and/or an alternative external power source. In yet further embodiments, the ALD drive unit 814 is configured for wireless communication with the row controller 812 and receives power via electrical connection with the row controller 812 and/or an alternative external power source.

The power source 836 of the ALD drive unit 814 is a non-rechargeable battery, though the battery may be rechargeable in other embodiments. In particular, the power source 836 includes a lithium-ion cell stack having a 5-ampere hour capacity. The boost converter 838 is electrically coupled to the power source 836 and operable to convert the battery output voltage to 6 volts DC.

The locking system motor 842 is operable to drive the lock shaft 190 (FIG. 13) between the sealed state and the unsealed state. The locking system motor 842 is electrically coupled to the boost converter 838 via an H-bridge 840. The H-bridge 840 receives the six volts direct current from the boost converter 838 and selectively control a polarity of an input voltage to the locking system motor 842 to facilitate controlling the motor 842 to seal or unseal the active damper lock. The H-bridge 840 may include any electronic circuit that is operable to switch the polarity of the input voltage to the locking system motor 842.

The SoC 846 is electrically coupled to the boost converter 838, the encoder 844, the H-bridge 840, the on-board antenna 848, the push buttons 850, and the LEDs 852. The SoC 846 may draw power from the boost converter 838 and selectively control the boost converter 838. The SoC 846 transmits a pulse width modification (PWM) signal to the H-bridge 840 to selectively control the H-bridge 840, and thereby selectively control operation and rotational direction of the locking system motor 842. The SoC 846 is configured to selectively adjust the speed of the locking system motor 842 (e.g., to change the speed of locking/unlocking the active damper lock) by adjusting the PWM signal to the H-bridge 840.

The encoder 844 and the on-board antenna 848 are also electrically coupled to the SoC 846. The onboard antenna 848 is a transceiver configured for two-way wireless communication with the row controller 812. In particular, the onboard antenna 848 is a Bluetooth low energy antenna. The encoder 844 tracks a state of the locking motor 842 (e.g., whether the active damper lock is in the sealed or unsealed state). In particular, the encoder 844 is a rotary encoder that senses an angular position of the shaft of the locking system motor 842 and transmits the detected position in the form of an electrical signal to the SoC 846. After a message from the row controller 812 to lock the active damper lock is received, the SoC 846 controls the locking system motor 842 to lock the active damper lock and the encoder 844 detects the changed position of the shaft. The SoC may also transmit a signal to the row controller 812 indicating a state of the locking system motor 842 based on the signal from the encoder 844.

The SoC 846 and the locking system motor 842 generally only draw power from the power source 836 either when a command has been provided from the row controller 812 (e.g., to lock or unlock the active damper lock) or to check whether a message has been received. As a result, the five-ampere hour capacity of the power source 836 has an expected life span of approximately 10 years with regular use.

Figure 35:
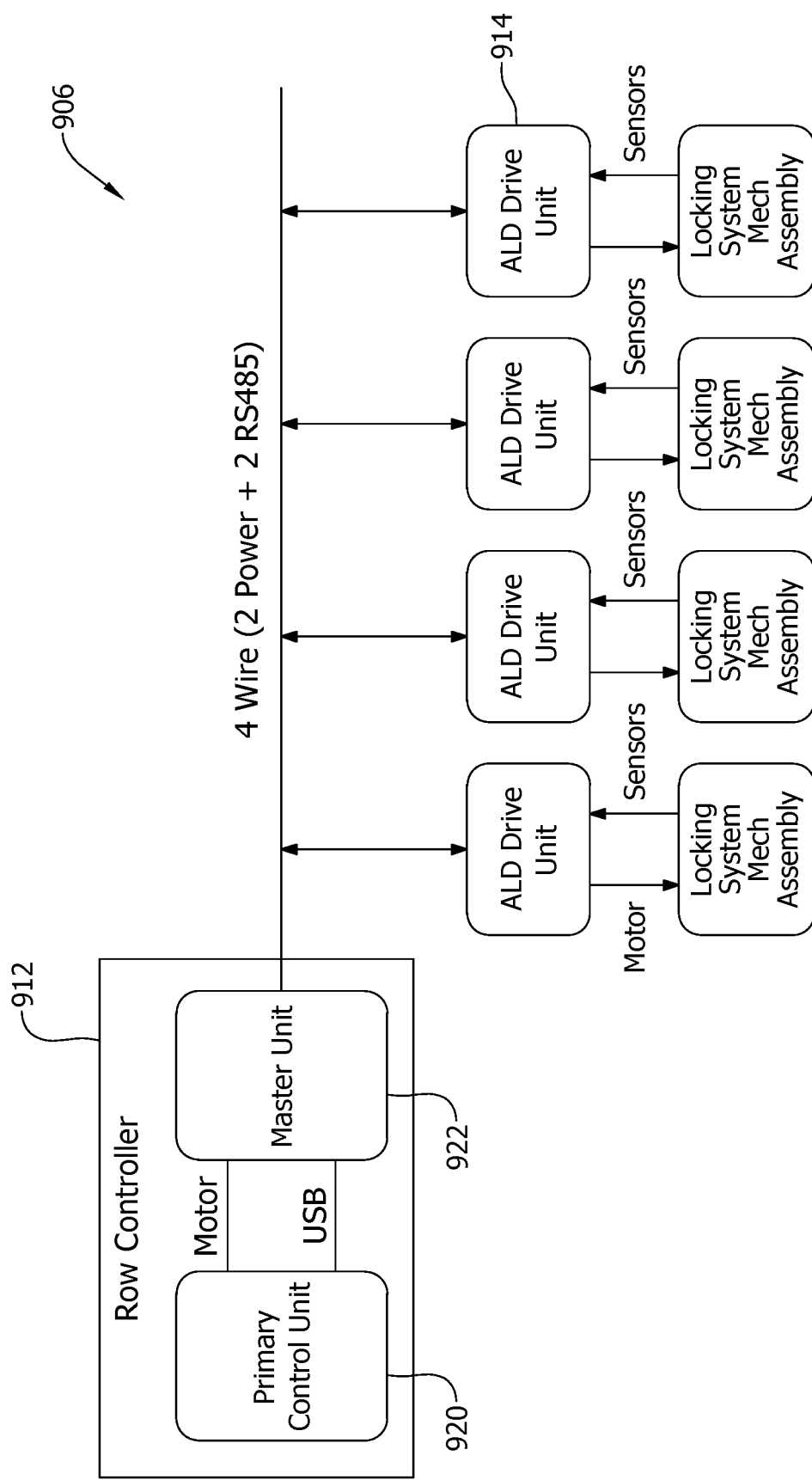
FIG. 35 is a schematic view of an alternative embodiment of a solar array row for use with the control system of FIG. 31.

FIG. 35 is an alternative control system 906 for the first solar array row 804 shown in FIG. 31. The control system 906 is substantially the same as the control system 806 described above with respect to FIGS. 32-34 except as described below. For example, in contrast to the above-described control system 806, in the embodiment of FIG. 35, the ALD drive units 914 are each coupled in communication with the row controller 912, or more specifically, the master unit 822, via wires.

The master unit 922 is connected to a motor port of the primary control unit 920 and to a USB port of the primary control unit 920. The motor port of the primary control unit provides electrical power from a power source (e.g., generated from the controller power panels shown in FIG. 2) to the master unit 922.

Each ALD drive unit 914 is coupled to the row controller 912 via two power transmitting wires and two data transmitting wires. The power transmitting wires provide electrical power from the master unit (and received from the primary control unit via the motor port) to each of the ALD drive units 914. The received electrical power may be used by the ALD drive units 914 to power the unit's corresponding motors and sensors. The data transmitting wires are configured for two-way electrical communication between the row controller and the ALD drive units 914. The data transmitting wires are RS-485 standard wires. In other embodiments, the ALD drive units 914 may be coupled to the row controller 912 by any number and/or type of wires that enable the first solar array row 804 to function as described herein.

Figure 36:
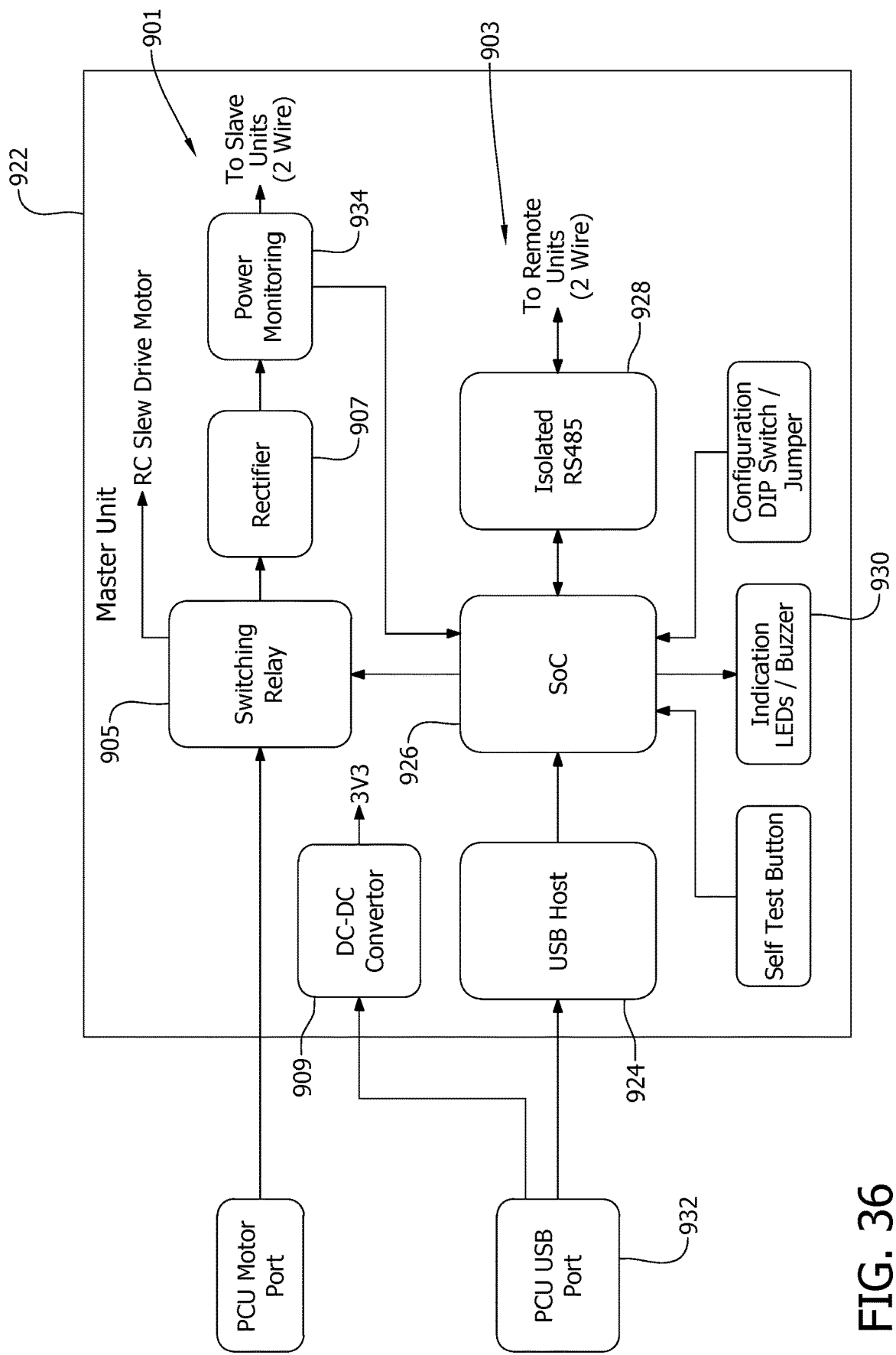
FIG. 36 is a schematic view of a master unit shown in the solar array row of FIG. 35.

FIG. 36 is a schematic view of the master unit 922 shown in FIG. 35. The master unit 922 includes a power control circuitry 901 and data control circuitry 903. The power control circuitry 901 includes a switching relay 905, a rectifier 907, and a power monitoring stack 934. A DC-to-DC converter 909 may also be included to transmit power to the switching relay 905 that is received from the primary control unit USB port 932. The data control circuitry 903 includes a USB host 924, an SoC 926, and an isolated RS485 transceiver 928. In addition to powering the ALD units 922, the master unit 922 also provides power to the torque tube drive 120 (shown in FIG. 2), also referred to herein as an "RC Slew Drive Motor". In other embodiments, the primary control unit 920 provides power to the torque tube drive 120.

Figure 37:
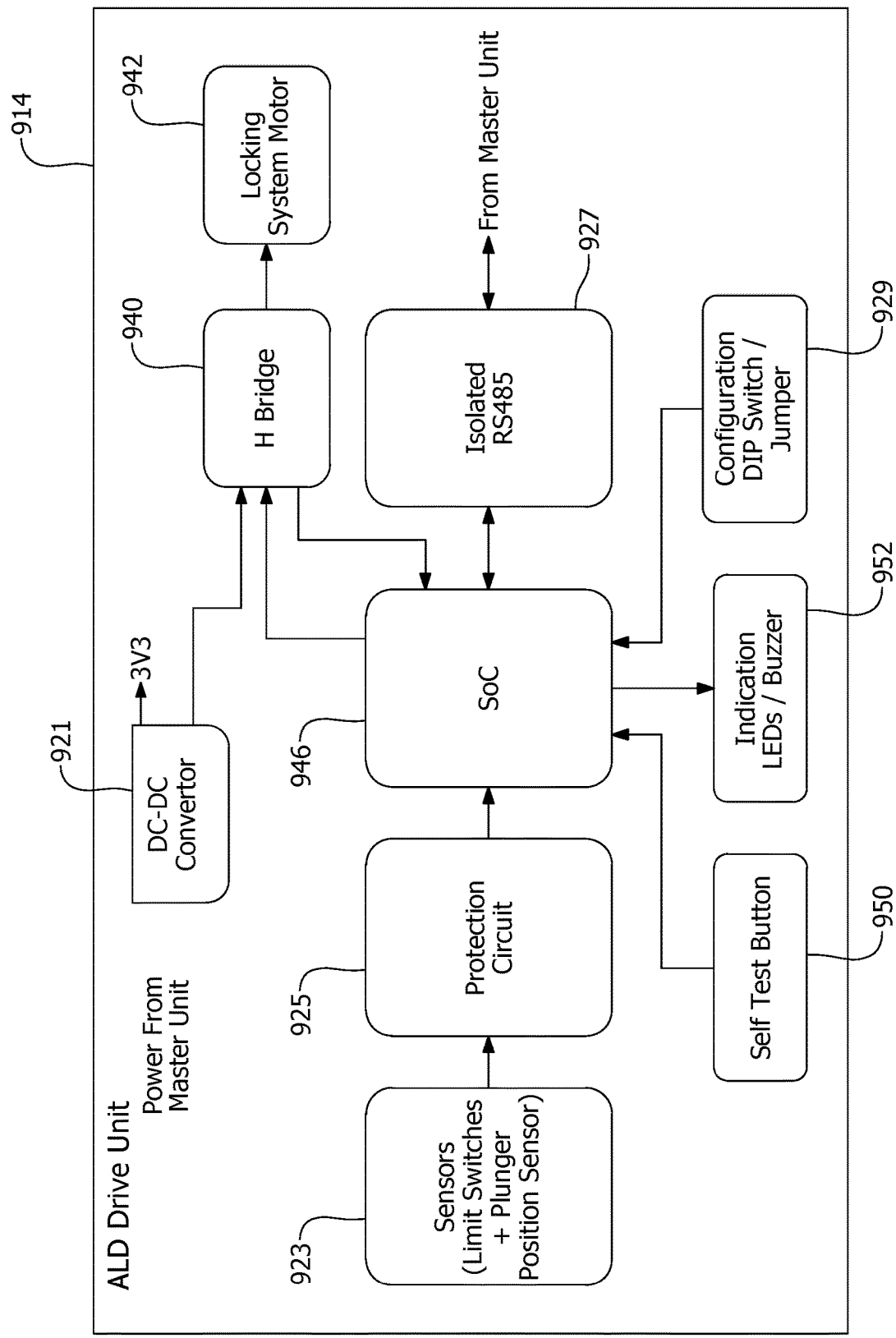
FIG. 37 is a schematic view of an active lock device drive unit shown in the solar array row of FIG. 35.

FIG. 37 is a schematic of the ALD drive unit 914 shown in FIG. 35. The ALD drive unit 914 includes a DC-DC converter 921, and H-Bridge 940, a locking system motor 942, sensors 923, a protection circuit 925, an SoC 946, an isolated RS485 transceiver 927, a self test button 950, indication LEDs 952, and a configuration dual in-line package ("DIP") switch/jumper 929. The SoC 946 receives and transmits electrical signals to the master unit 922 via the isolated RS485 transceiver 927. The SoC 946 is configured to control the locking system motor 942 in substantially the same manner as described above with respect to the ALD drive unit 814 shown in FIG. 34. However, in the example embodiment, power is provided to the locking system motor 942 and H-Bridge 940 via the power connection from the master unit 922.

In some embodiments, the above-described systems and methods are electronically or computer controlled. The embodiments described herein are not limited to any particular system controller or processor for performing the processing tasks described herein. The term "controller" or "processor", as used herein, is intended to denote any machine capable of performing the calculations, or computations, necessary to perform the tasks described herein. The terms "controller" and "processor" also are intended to denote any machine capable of accepting a structured input and of processing the input in accordance with prescribed rules to produce an output. It should also be noted that the phrase "configured to" as used herein means that the controller/processor is equipped with a combination of hardware and software for performing the tasks of embodiments of the disclosure, as will be understood by those skilled in the art. The terms "controller" and "processor", as used herein, refers to central processing units, microprocessors, microcontrollers, reduced instruction set circuits (RISC), application specific integrated circuits (ASIC), logic circuits, and any other circuit or processor capable of executing the functions described herein.

The computer implemented embodiments described herein embrace one or more computer readable media, including non-transitory computer readable storage media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A solar tracker system comprising:
    a torque tube;
    a column supporting the torque tube;
    a solar panel connected to the torque tube; and
    a damper assembly having a first end pivotably connected to the torque tube and a second end pivotably connected to the column, the damper assembly comprising:
        an outer shell;
        a piston within the outer shell and moveable relative to the outer shell;
        a first chamber wall and a second chamber wall within the outer shell at least partially defining a chamber; and
        a valve within the chamber, the valve having a first axial end defining a slot, wherein the valve is biased to a first position within the chamber in which the first axial end is spaced from the first chamber wall, the valve being moveable within the chamber from the first position to a second position to passively change a flow resistance of the damper assembly, wherein, when the valve is in the second position, the first axial end contacts the first chamber wall and fluid flow through the valve is directed through the slot in the first axial end.

2. The solar tracker system of claim 1 further comprising a valve jacket at least partially defining the chamber, the valve being positioned within the valve jacket, wherein the valve further includes an outer surface facing the valve jacket and a sidewall extending across the valve, wherein the sidewall directs fluid flow through the chamber between the outer surface of the valve and the valve jacket.

3. The solar tracker system of claim 2, wherein the valve further includes an inner surface opposite the outer surface, and wherein the sidewall extends across the inner surface.

4. The solar tracker system of claim 1, wherein the valve further includes a second axial end opposite the first axial end, the second axial end defining an additional slot therein.

5. The solar tracker system of claim 1 further comprising a biasing assembly within the chamber that biases the valve to the first position.

6. The solar tracker system of claim 5, wherein the valve further includes a first surface and an opposite facing second surface, and wherein the biasing assembly includes a first biasing element that engages the first surface and a second biasing element that engages the second surface.

7. The solar tracker system of claim 1, wherein the damper assembly has a higher flow resistance when the valve is in the second position than when the valve is in the first position.

8. The solar tracker system of claim 1, wherein the valve further includes an outer surface having axially extending ridges that define respective axially extending channels therebetween, and wherein fluid flow through the chamber is directed through the axially extending channels.

9. The solar tracker system of claim 1, wherein the damper assembly is in a low resistance state when the valve is in the first position and is in a high resistance state when the valve is in the second position, and wherein the damper assembly has substantially constant flow resistance as the valve is moved within the chamber until the valve is in the second position.

10. The solar tracker system of claim 1, wherein the slot extends axially inward of the valve from the first axial end.

11. A damper assembly for use in a solar tracker system, the damper assembly comprising:
an outer shell for pivotably connecting the damper assembly to a first portion of the solar tracker system;
a piston for pivotably connecting the damper assembly to a second portion of the solar tracker system, the piston being within the outer shell and moveable relative to the outer shell;
a first chamber wall and a second chamber wall within the outer shell at least partially defining a chamber; and
a valve including a first axial end defining a slot, the valve being biased to a first position within the chamber in which the first axial end is spaced from the first chamber wall, the valve being moveable within the chamber from the first position to a second position to passively change a flow resistance of the damper assembly, wherein, when the valve is in the second position, the first axial end contacts the first chamber wall and fluid flow through the valve is directed through the slot in the first axial end.

12. The damper assembly of claim 11 further comprising a valve jacket at least partially defining the chamber, the valve being positioned within the valve jacket, wherein the valve further includes an outer surface facing the valve jacket and a sidewall extending across the valve, wherein the sidewall directs fluid flow through the chamber between the outer surface of the valve and the valve jacket.

13. The damper assembly of claim 12, wherein the valve further includes an inner surface opposite the outer surface, and wherein the sidewall extends across the inner surface.

14. The damper assembly of claim 11, wherein the valve further includes a second axial end opposite the first axial end, the second axial end defining an additional slot therein.

15. A solar tracker system comprising:
a torque tube;
a column supporting the torque tube;
a solar panel connected to the torque tube; and
a damper assembly having a first end pivotably connected to the torque tube and a second end pivotably connected to the column, the damper assembly comprising:
an outer shell;
a piston within the outer shell and moveable relative to the outer shell;
a first chamber wall and a second chamber wall within the outer shell at least partially defining a chamber; and
a valve within the chamber, the valve having a first axial end defining a slot, wherein the valve is biased to a first position within the chamber in which the first axial end is spaced from the first chamber wall, the valve being moveable within the chamber from the first position to a second position to passively change a flow resistance of the damper assembly, wherein the valve further includes an outer surface having axially extending ridges that define respective axially extending channels therebetween, and wherein fluid flow through the chamber is directed through the axially extending channels.

16. The solar tracker system of claim 15 further comprising a valve jacket at least partially defining the chamber, the valve being positioned within the valve jacket, wherein the valve further includes an outer surface facing the valve jacket and a sidewall extending across the valve, wherein the sidewall directs fluid flow through the chamber between the outer surface of the valve and the valve jacket.

17. The solar tracker system of claim 16, wherein the valve further includes an inner surface opposite the outer surface, and wherein the sidewall extends across the inner surface.

18. The solar tracker system of claim 15, wherein the valve further includes a second axial end opposite the first axial end, the second axial end defining an additional slot therein.

19. The solar tracker system of claim 15 further comprising a biasing assembly within the chamber that biases the valve to the first position.

20. The solar tracker system of claim 19, wherein the valve further includes a first surface and an opposite facing second surface, and wherein the biasing assembly includes a first biasing element that engages the first surface and a second biasing element that engages the second surface.

* * * * *